(12) United States Patent
Inoue et al.

(10) Patent No.: US 10,794,323 B2
(45) Date of Patent: Oct. 6, 2020

(54) CONTROL SYSTEM FOR COMPRESSION-IGNITION ENGINE

(71) Applicant: Mazda Motor Corporation, Aki-gun, Hiroshima (JP)

(72) Inventors: Atsushi Inoue, Aki-gun (JP); Masanari Sueoka, Hiroshima (JP); Keiji Maruyama, Hiroshima (JP); Takuya Ohura, Hiroshima (JP); Tomohiro Nishida, Hiroshima (JP); Yusuke Kawai, Hiroshima (JP); Tetsuya Chikada, Higashihiroshima (JP); Tatsuhiro Tokunaga, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/413,420

(22) Filed: May 15, 2019

(65) Prior Publication Data
US 2019/0360425 A1   Nov. 28, 2019

(30) Foreign Application Priority Data

May 22, 2018 (JP) .................................. 2018-097821

(51) Int. Cl.
*F01L 1/34* (2006.01)
*F02D 13/02* (2006.01)
(Continued)

(52) U.S. Cl.
CPC .............. *F02D 41/402* (2013.01); *F01L 1/34* (2013.01); *F02B 1/06* (2013.01); *F02B 1/08* (2013.01);
(Continued)

(58) Field of Classification Search
CPC .......... F02B 1/08; F02B 1/10; F02D 13/0261; F02D 41/3029; F02D 41/3041
(Continued)

(56) References Cited

U.S. PATENT DOCUMENTS

| 6,293,246 B1 * | 9/2001 | Tanahashi ................. F01L 1/34 123/305 |
| 7,337,762 B2 * | 3/2008 | Eng ........................... F01L 1/34 123/295 |

(Continued)

FOREIGN PATENT DOCUMENTS

| EP | 3418540 A1 | 12/2018 |
| JP | 2009108778 A | 5/2009 |
| JP | 6249667 B2 | 12/2017 |

OTHER PUBLICATIONS

Xie, H. et al, "Study on spark assisted compression ignition (SACI) combustion with positive valve overlap at medium-high load," Journal of Applied Energy, Aug. 3, 2012, 12 pages.

(Continued)

*Primary Examiner* — Erick R Solis
(74) *Attorney, Agent, or Firm* — Alleman Hall Creasman & Tuttle LLP

(57) ABSTRACT

A compression-ignition engine control system is provided, which includes an intake phase-variable mechanism and a controller. The controller controls the intake phase-variable mechanism to form a gas-fuel ratio (G/F) lean environment in which burnt gas remains inside a cylinder and an air-fuel ratio is near a stoichiometric air-fuel ratio, and controls the spark plug to spark-ignite the mixture gas to combust in a partial compression-ignition combustion. The controller controls the intake phase-variable mechanism to retard, as an engine speed increases at a constant engine load, an intake valve close timing on a retarding side of BDC of intake stroke and an intake valve open timing on an advancing side (Continued)

of TDC of exhaust stroke, and controls the intake phase-variable mechanism so that a change rate in the intake valve open timing according to the engine speed becomes larger in a high engine speed range.

8 Claims, 18 Drawing Sheets

(51) Int. Cl.
  *F02D 41/40* (2006.01)
  *F02B 1/06* (2006.01)
  *F02D 41/30* (2006.01)
  *F02B 1/08* (2006.01)
(52) U.S. Cl.
  CPC ..... *F02D 13/0261* (2013.01); *F02D 41/3029* (2013.01)
(58) Field of Classification Search
  USPC .......................................... 123/295, 299, 305
  See application file for complete search history.

(56) References Cited

U.S. PATENT DOCUMENTS

| 7,360,523 | B2* | 4/2008 | Sloane | F02B 17/005 |
| | | | | 123/305 |
| 7,431,011 | B2* | 10/2008 | Wagner | F02D 13/0261 |
| | | | | 123/299 |
| 9,140,199 | B2* | 9/2015 | Mond | F02D 23/00 |
| 9,664,135 | B2* | 5/2017 | Kang | F02D 41/0062 |
| 2009/0093946 | A1* | 4/2009 | Yamashita | F01L 1/08 |
| | | | | 701/103 |
| 2014/0283800 | A1 | 9/2014 | Hellstrom et al. | |
| 2016/0123268 | A1* | 5/2016 | Kawabe | F02D 13/0261 |
| | | | | 123/478 |
| 2018/0334998 | A1* | 11/2018 | Inoue | F02B 23/0696 |

OTHER PUBLICATIONS

Gerow, M. et al., "A Comparison of Valving Strategies Appropriate for Multi-mode Combustion Within a Downsized Boosted Automotive Engine Part B: Mid Load Operation Withing the SACI Combustion Regime," Proceedings of the ASME 2013 International Combustion Engine Division Fall Technical Conference, Dearborn, Michigan, Oct. 13, 2013, 14 pages.

Szybist, J. et al., "Load Expansion of Stoichiometric HCCI Using Spark Assist and Hydraulic Valve Actuation," SAE International, Oct. 25, 2010, 15 pages.

Triantopolous V., "Experimental and Computational Investigation of Spark Assisted Compression Ignition Combustion Under Boosted, Ultra EGR-Dilute Conditions," Doctor of Philosophy Thesis, University of Michigan, 2018, 238 pages.

European Patent Office, Extended European Search Report Issued in Application No. 19174803.7, Oct. 22, 2019, Germany, 14 pages.

* cited by examiner

CONTROL SYSTEM FOR COMPRESSION-IGNITION ENGINE

TECHNICAL FIELD

The present disclosure relates to a control system for a compression-ignition engine, which executes partial compression-ignition combustion in which a mixture gas within a cylinder is partially combusted by spark-ignition (SI combustion) and then the remaining mixture gas is combusted by self-ignition (CI combustion).

BACKGROUND OF THE DISCLOSURE

Recently, Homogeneous-Charge Compression Ignition (HCCI) combustion in which gasoline fuel mixed with air is combusted by self-ignition inside a sufficiently compressed combustion chamber has attracted attention. HCCI combustion is a mode in which the mixture gas combusts at a plurality of positions simultaneously without flame propagation, and thus, has a higher combustion speed of the mixture gas than in SI combustion (spark-ignition combustion) which is adopted for general gasoline engines. Therefore, HCCI combustion is said to be significantly advantageous in terms of thermal efficiency. However, in a case of implementing HCCI combustion in an engine of an automobile for which improved thermal efficiency is desired, there are various issues to be solved and an engine which suitably performs HCCI combustion has not been put into practical use. That is, while the engine mounted on the automobile greatly changes in operating state and its environmental condition, HCCI combustion has issues such as a combustion start timing of the mixture gas (a timing that the mixture gas self-ignites) greatly varies due to external factors (e.g., atmospheric temperature) and control during a transient operation in which an engine load sharply changes being difficult.

Therefore, instead of combusting all of the mixture gas by self-ignition, it is proposed to combust a portion of the mixture gas by spark-ignition using a spark plug. That is, after forcibly combusting a portion of the mixture gas through flame propagation caused by spark-ignition (SI combustion), the remaining mixture gas is combusted by self-ignition (CI combustion). Hereinafter, such combustion mode is referred to as "SPCCI (SPark Controlled Compression Ignition) combustion."

For example, JP2009-108778A discloses an engine adopting a similar concept to the SPCCI combustion. This engine causes flame propagation combustion by spark-igniting a stratified mixture gas which is formed around a spark plug by a supplementary fuel injection, and then performs a main fuel injection inside a combustion chamber warmed up by an effect of the flame propagation combustion, so as to combust through self-ignition the fuel injected in the main fuel injection.

The CI combustion of the SPCCI combustion occurs when a temperature inside a cylinder (in-cylinder temperature) reaches an ignition temperature of the mixture gas determined by a composition of the mixture gas. Fuel efficiency is maximized by causing the CI combustion when the in-cylinder temperature reaches the ignition temperature near a top dead center (TDC) of compression stroke. The in-cylinder temperature increases as pressure inside the cylinder (in-cylinder pressure) increases. An increase in the in-cylinder pressure on the compression stroke when the SPCCI combustion is carried out is caused by two factors: compression work of a piston and the combustion energy of the SI combustion. If the flame propagation of the SI combustion is not stable, increasing amounts of the in-cylinder pressure and the in-cylinder temperature resulting from the SI combustion decreases, and thereby it becomes difficult to increase the in-cylinder temperature to the ignition temperature. If the in-cylinder temperature does not fully increase to the ignition temperature, an amount of the mixture gas for the CI combustion decreases, which results in that a large amount of the mixture gas combusts by the flame propagation of a long combustion period, or the CI combustion takes place when the piston descends considerably, and as a result, fuel efficiency decreases. Thus, in order to stabilize the CI combustion to maximize fuel efficiency, it is important to stabilize the flame propagation of the SI combustion.

It may be possible to stabilize the flame propagation of the SI combustion by leaving hot burnt gas in the cylinder. However, if the burnt gas excessively remains in the cylinder, the flame propagation becomes slower by the burnt gas, which causes the CI combustion to occur when the piston descends considerably during expansion stroke, thereby lowering fuel efficiency.

Thus, since the SPCCI combustion is a novel combustion type, a configuration which can realize the suitable SPCCI combustion has not yet been found so far.

SUMMARY OF THE DISCLOSURE

The present disclosure is made in view of the above situations, and to provide a control system for a compression-ignition engine which realizes a suitable partial compression-ignition combustion more certainly.

In order to address the above situations, the present inventors diligently examined a more suitable control of an intake phase-variable mechanism by simultaneously changing an open timing and a close timing of an intake valve, while causing the SPCCI combustion at various engine speeds. As a result, the present inventors determined that the suitable SPCCI combustion can be realized in a wide range of the engine speed by retarding the open timing and the close timing of the intake valve when the engine speed is high, and increasing a rate of change in the open timing and the close timing of the intake valve according to the engine speed as the engine speed increases.

According to one aspect of the present disclosure, a control system for a compression-ignition engine is provided. The engine includes a cylinder, an intake passage, an exhaust passage, an intake port communicating the intake passage to the cylinder, an intake valve configured to open and close the intake port, an exhaust port communicating the exhaust passage to the cylinder, an exhaust valve configured to open and close the exhaust port, an injector configured to inject fuel into the cylinder, and a spark plug configured to ignite mixture gas containing the fuel injected by the injector and air, the engine executing partial compression-ignition combustion in which the mixture gas is spark-ignited with the spark plug to be partially combusted by spark ignition (SI) combustion and the remaining mixture gas self-ignites to be combusted by compression ignition (CI) combustion. The control system includes an intake phase-variable mechanism configured to simultaneously change an open timing and a close timing of the intake valve, and a controller including a processor configured to control parts of the engine, including the intake phase-variable mechanism and the spark plug. The controller controls the intake phase-variable mechanism to form a gas-fuel ratio (G/F) lean environment in which burnt gas remains inside the cylinder and an air-fuel ratio that is a ratio of air to fuel inside the cylinder is near a stoichiometric air-fuel ratio, and controls the spark plug to spark-ignite the mixture gas so as to combust by the partial compression-ignition combustion at a given timing. The controller controls the intake phase-variable mechanism to retard, as an engine speed increases at a constant engine load, the close timing of the intake valve on a retarding side of a bottom dead center of intake stroke and the open timing of the intake valve on an advancing side of a top dead center of exhaust stroke, so that a rate of change in the open timing of the intake valve according to the engine speed in a high engine speed range becomes larger than that in a low engine speed range.

According to this configuration, while performing the partial compression-ignition combustion (SPCCI combustion) under the G/F lean environment, the close timing of the intake valve is retarded on the retarding side of the bottom dead center (BDC) of the intake stroke as the engine speed increases. Thus, by utilizing the inertia of the intake air when the engine speed is high, a large amount of air introduced into the cylinder is secured to improve stability of the SI combustion. Therefore, while leaving burnt gas in the cylinder and making the air-fuel ratio of the mixture gas inside the cylinder near the stoichiometric air-fuel ratio, suitable SPCCI combustion is realized to improve fuel efficiency.

On the other hand, when the engine speed is low, that is, when a number of combustion per unit time is small and accordingly the in-cylinder temperature easily drops, the open timing of the intake valve is advanced than the top dead center (TDC) of the exhaust stroke, which results in that the large amount of burnt gas remaining inside the cylinder can be secured, and thus, the in-cylinder temperature is suitably increased to improve the stability of the SI combustion. Specifically, when the open timing of the intake valve is advanced than TDC of the exhaust stroke, burnt gas once discharged from the cylinder to the intake port can be flowed back into the cylinder. This burnt gas flowing back into the cylinder increases as the advancing amount of the open timing of the intake valve from TDC of the exhaust stroke increases. Therefore, with such a configuration described above, when the engine speed is low, the amount of high-temperature burnt gas introduced into the cylinder can be increased.

However, when the engine speed is low, if the open timing of the intake valve is excessively advanced, the amount of burnt gas inside the cylinder becomes excessive, which may degrade the stability of the SI combustion. In this regard, the change rate of the open timing of the intake valve is reduced when the engine speed is low, and the open timing of the intake valve is prevented from being excessively advanced. Thus, the stability of the SI combustion can be improved reliably, and the suitable CI combustion and SPCCI combustion are realized more reliably.

The controller may control the intake phase-variable mechanism so that the close timing of the intake valve is fixed in the low engine speed range, regardless of the engine speed.

According to this configuration, the amount of burnt gas inside the cylinder is surely prevented from being excessively increased when the engine speed is low, which reliably improves combustion stability.

While the engine operates within a given first operating range where the partial compression-ignition combustion is carried out under the G/F lean environment, the controller may control the spark plug and the intake phase-variable mechanism to retard, as the engine speed increases at a constant engine load, the close timing of the intake valve on the retarding side of the bottom dead center of intake stroke and the open timing of the intake valve on the advancing side of the top dead center of exhaust stroke so that the rate of change in the open timing of the intake valve according to the engine speed in the high engine speed range becomes larger than that in the low engine speed range. While the engine operates within a given second operating range that is on a lower engine load side than the first operating range and within which the partial compression-ignition combustion is carried out under the G/F lean environment, the controller may control the intake phase-variable mechanism to retard the close timing of the intake valve, as the engine speed increases in a high engine speed segment at a constant engine load. While the engine operates in a low engine speed segment within the second operating range, the controller may control the intake phase-variable mechanism to retard, at a particular engine speed set at an intermediate location of the low engine speed segment, the close timing of the intake valve to a particular timing on a retarding side of the close timing of the intake valve at other engine speeds in the low engine speed segment.

Here, it was found that within the range in which the engine load is comparatively low, in the low engine speed range, the close timing of the intake valve is to be brought to the timing on the retarding side at an intermediate speed of this range so as to introduce a suitable amount of air into the cylinder. Note that this is considered to be influenced by pulsation of the intake air, etc. Thus, according to this configuration, even within the second operating range, the combustion stability improves and the suitable amount of air is introduced into the cylinder.

While the engine operates in the low engine speed segment within the second operating range, the controller may control the intake phase-variable mechanism to retard the close timing of the intake valve toward the particular timing as the engine speed increases, when the engine speed is lower than the particular engine speed, and retard the close timing of the intake valve to the particular timing as the engine speed decreases, when the engine speed is higher than the particular engine speed.

Thus, compared to a case where the close timing of the intake valve is locally retarded only at near the particular engine speed, a situation in which the close timing of the intake valve sharply changes with respect to the engine speed is prevented, which improves the controllability of the close timing of the intake valve.

The control system may further include an exhaust variable mechanism configured to change a close timing of the exhaust valve. While the engine operates in the low engine speed segment within the second operating range, the controller may control the exhaust variable mechanism to maintain a close timing of the exhaust valve at a substantially constant timing, regardless of the engine speed.

In this manner, the controllability of the exhaust valve improves.

While the engine operates in an engine speed segment where the engine speed is at least higher than the low engine speed segment within the second operating range, the controller may control the exhaust variable mechanism to advance, as the engine speed increases, the close timing of the exhaust valve on a retarding side of the top dead center of the exhaust stroke.

According to this configuration, within the second operating range, the amount of burnt gas flowing to the exhaust port and then flowing back into the cylinder can be reduced when the engine speed is especially high. This can prevent that the amount of burnt gas excessively increases to interrupt the introduction of air. On the contrary, within the second operating range, when the engine speed is comparatively low, the amount burnt gas is increased to suitably increase the in-cylinder temperature, which can improve combustion stability more reliably.

The control system may further include a booster configured to boost intake air to be introduced into the cylinder, and a boost switching mechanism configured to switch a state of the booster between a boosting state in which the booster boosts intake air and a non-boosting state in which the booster does not boost intake air. While the engine operates within the second operating range, the controller may control the boost switching mechanism to set the state of the booster as the non-boosting state, and while the partial compression-ignition combustion is carried out under the G/F lean environment within a third operating range that is on a higher engine load side than the first operating range, the controller may control the boost switching mechanism to set the state of the booster as the boosting state, and control the intake phase-variable mechanism so that the close timing of the intake valve is maintained at a constant timing, regardless of the engine speed.

According to this configuration, within the third operating range, while improving the controllability of the intake valve, a large amount of air corresponding to the high engine load can be introduced into the cylinder by the boost. Here, when the boost is performed, even if the intake valve is opened on the advancing side of TDC of the exhaust stroke, the burnt gas is interrupted from flowing from the cylinder to the intake port, and the amount of burnt gas remaining inside the cylinder easily reduces. In this regard, within the second operating range in which the engine load is low, since the boost is stopped and the intake valve is opened on the advancing side of TDC of exhaust stroke as described above, the amount of burnt gas remaining inside the cylinder can be secured and accordingly the in-cylinder temperature is increased and combustion stability is improved.

During the partial compression-ignition combustion, the controller may set a target SI ratio according to an operating condition of the engine and set an ignition timing of the spark plug based on the target SI ratio, the target SI ratio being a target value of a ratio of a heat amount generated by the SI combustion with respect to a total heat generation amount in one combustion cycle.

According to this configuration, by adjusting the ignition timing so as to realize the SPCCI combustion conforming to the target SI ratio, for example, the ratio of the CI combustion is increased (i.e., the SI ratio is reduced). This results in improving thermal efficiency by the SPCCI combustion as much as possible.

BRIEF DESCRIPTION OF THE DRAWINGS

FIGS. 5A to 5C are operation maps illustrating a difference in control according to a progression of a warm-up of the engine and an engine speed and an engine load, in which FIG. 5A is a first operation map used in a warmed-up state, FIG. 5B is a second operation map used in a partially warmed-up state, and FIG. 5C is a third operation map used in a cold state.

DETAILED DESCRIPTION OF THE DISCLOSURE (1) Overall Configuration of Engine

Figure 1:
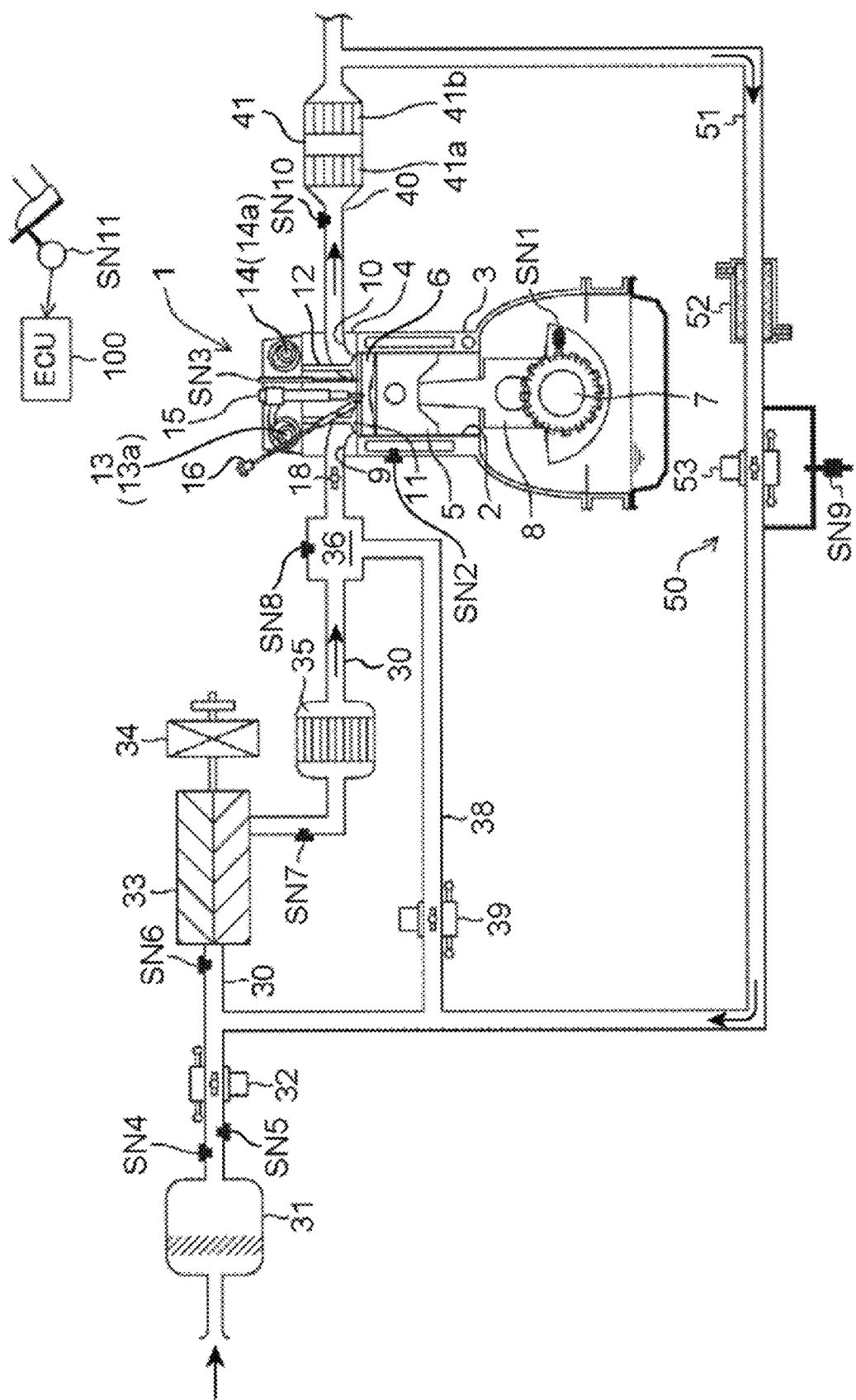
FIG. 1 is a system diagram schematically illustrating an overall configuration of a compression-ignition engine according to one embodiment of the present disclosure.
Figure 2:
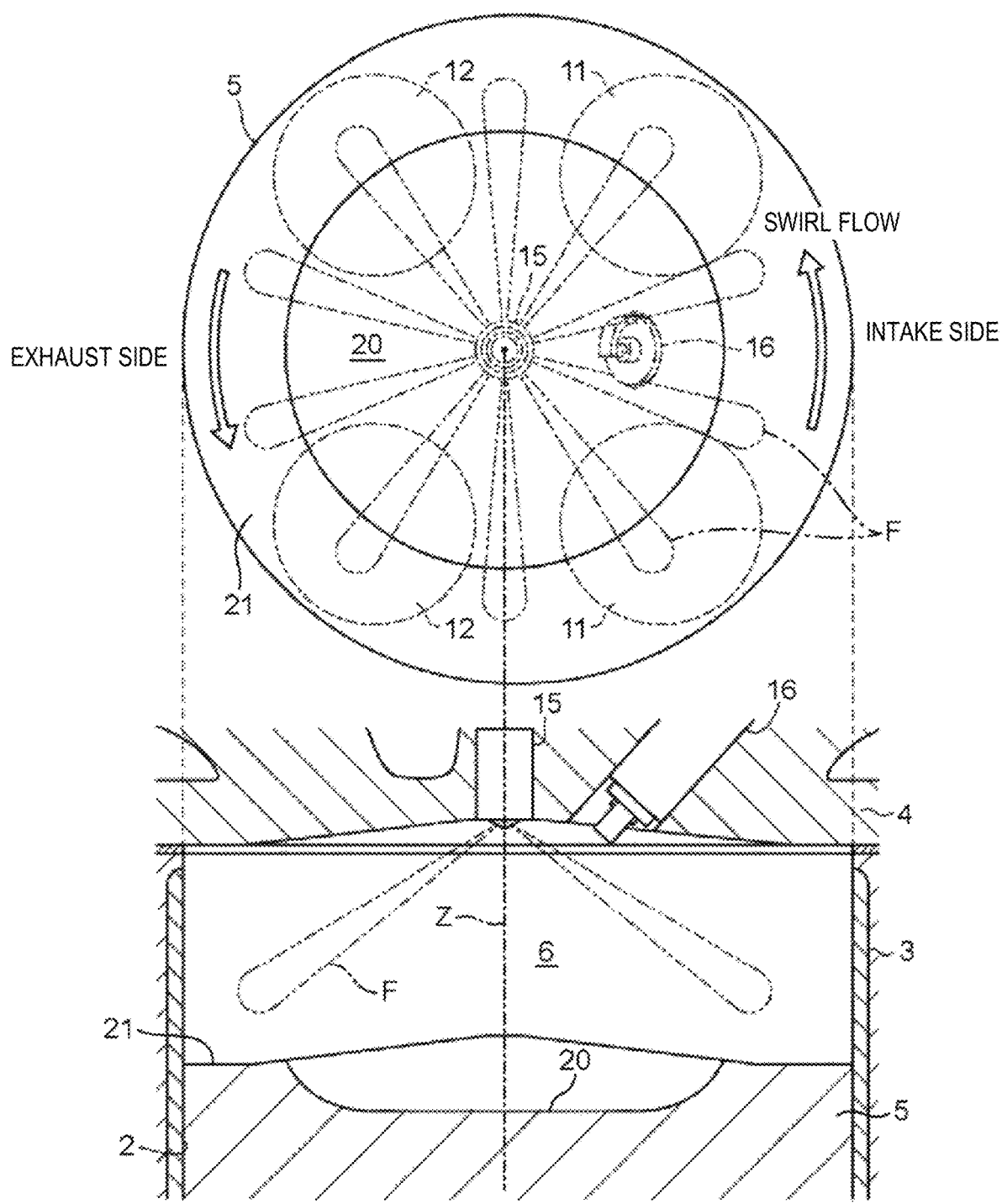
FIG. 2 shows diagrams illustrating a cross-sectional view of an engine body and a plan view of a piston.

FIGS. 1 and 2 are diagrams illustrating a suitable embodiment of a compression-ignition engine (hereinafter, simply referred to as "the engine") to which a control system of the present disclosure is applied. The engine illustrated in FIGS. 1 and 2 is a four-cycle gasoline direct-injection engine mounted on a vehicle as a drive source for traveling, and includes an engine body 1, an intake passage 30 through which intake air to be introduced into the engine body 1 flows, an exhaust passage 40 through which exhaust gas discharged from the engine body 1 flows, and an external EGR device 50 which recirculates a portion of the exhaust gas flowing through the exhaust passage 40 to the intake passage 30.

The engine body 1 has a cylinder block 3 formed therein with cylinders 2, a cylinder head 4 attached to an upper surface of the cylinder block 3 so as to cover above the cylinders 2, and a piston 5 reciprocatably fitted into each cylinder 2. Typically, the engine body 1 is of a multi-cylinder type having a plurality of cylinders (e.g., four cylinders). Here, the description is only given regarding one cylinder 2 for the sake of simplicity.

A combustion chamber 6 is defined above the piston 5, and a fuel containing gasoline as a main component is injected into the combustion chamber 6 by an injector 15 (described later). Further, the supplied fuel is combusted while being mixed with air in the combustion chamber 6, and expansion force caused by this combustion pushes down the piston 5, and thus, it reciprocates in up-and-down directions of the cylinder. Note that the fuel injected into the combustion chamber 6 may be any fuel as long as it contains gasoline as a main component and, for example, it may contain a subcomponent, such as bioethanol, in addition to gasoline.

A crankshaft 7, which is an output shaft of the engine body 1, is provided below the piston 5. The crankshaft 7 is connected to the piston 5 via a connecting rod 8 and rotates about its center axis according to the reciprocation (up-and-down motion) of the piston 5.

A geometric compression ratio of the cylinder 2, that is, a ratio of the volume of the combustion chamber 6 when the piston 5 is at a top dead center (TDC) to the volume of the combustion chamber 6 when the piston 5 is at a bottom dead center (BDC), is set between 13:1 and 30:1, more preferably between 14:1 and 18:1 as a suitable value for SPCCI (SPark Controlled Compression Ignition) combustion described later. More specifically, the geometric compression ratio of the cylinder 2 is set between 14:1 and 17:1 in regular specifications using gasoline fuel having an octane number of about 91, and between 15:1 and 18:1 in high-octane specifications using gasoline fuel having an octane number of about 96.

The cylinder block 3 is provided with a crank angle sensor SN1 which detects a rotational angle of the crankshaft 7 (crank angle) and a rotational speed of the crankshaft 7 (engine speed), and a water temperature sensor SN2 which detects a temperature of a coolant flowing through inside the cylinder block 3 and the cylinder head 4 (engine water temperature).

The cylinder head 4 is formed with an intake port 9 which opens into the combustion chamber 6 to communicate with the intake passage 30 and an exhaust port 10 which opens into the combustion chamber 6 to communicate with the exhaust passage 40, and is provided with an intake valve 11 which opens and closes the intake port 9 and an exhaust valve 12 which opens and closes the exhaust port 10. Note that as illustrated in FIG. 2, the type of valve of the engine of this embodiment is a four-valve type including two intake valves and two exhaust valves. That is, the intake port 9 includes a first intake port 9A and a second intake port 9B, and the exhaust port 10 includes a first exhaust port 10A and a second exhaust port 10B (see FIG. 3). One intake valve 11 is provided for each of the first and second intake ports 9A and 9B, and one exhaust valve 12 is provided for each of the first and second exhaust ports 10A and 10B.

Figure 3:
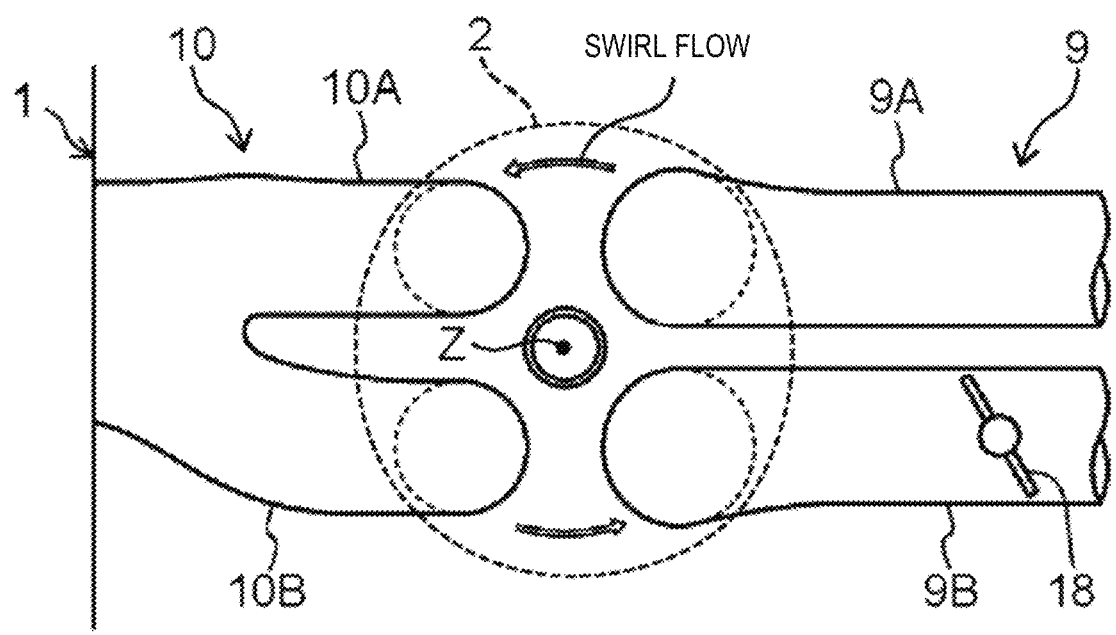
FIG. 3 is a schematic plan view illustrating a structure of a cylinder and intake and exhaust systems in the vicinity thereof.

As illustrated in FIG. 3, a swirl valve 18 openable and closable of the second intake port 9B is provided therein. The swirl valve 18 is only provided in the second intake port 9B, and not provided in the first intake port 9A. When such a swirl valve 18 is driven in the closing direction, since a rate of intake air flowing into the combustion chamber 6 from the first intake port 9A in which the swirl valve 18 is not provided increases, a circling flow circling around an axial line Z of the cylinder (a center axis of the combustion chamber 6), i.e., swirl flow is enhanced. Conversely, driving the swirl valve 18 in the opening direction weakens the swirl flow. Note that the intake port 9 of this embodiment is a tumble port formable of a tumble flow. Therefore, the swirl flow formed when closing the swirl valve 18 is an inclined swirl flow mixed with the tumble flow.

The intake valve 11 and the exhaust valve 12 are driven to open and close in conjunction with the rotation of the crankshaft 7 by valve operating mechanisms 13 and 14 including a pair of camshafts disposed in the cylinder head 4.

The valve operating mechanism 13 for the intake valve 11 is built therein with an intake VVT 13a configured to change open and close timings of the intake valve 11. Similarly, the valve operating mechanism 14 for the exhaust valve 12 is built therein with an exhaust VVT 14a configured to change open and close timings of the exhaust valve 12. The intake VVT 13a (exhaust VVT 14a) is a so-called phase-variable mechanism which changes the open and close timings of the intake valve 11 (exhaust valve 12) simultaneously and by the same amount. That is, the open and close timings of the intake valve 11 (exhaust valve 12) are changed while keeping the open period of the valve. The intake VVT 13a is one example of an "intake variable mechanism" or "intake phase-variable mechanism" and the exhaust VVT 14a is one example of an "exhaust variable mechanism."

The open timing of the intake valve 11 is changeable between a given timing on an advancing side of a top dead center (TDC) of exhaust stroke and a given timing on a retarding side of TDC of the exhaust stroke. The open period of the intake valve 11 is set so that when an open timing IVO of the intake valve 11 is at a most advanced timing (a most advanced timing possible), a close timing IVC of the intake valve 11 is set on the retarding side of a bottom dead center (BDC) of intake stroke. Accordingly, the close timing IVC of the intake valve 11 is changed on the retarding side of BDC of the intake stroke. An open timing EVO of the exhaust valve 12 is changeable between a given timing on the advancing side of TDC of the exhaust stroke and a given timing on the retarding side of TDC of the exhaust stroke.

Note that the open timing of the intake valve 11 (exhaust valve 12) described here is not a timing when its lift increases from zero (0), but a timing when a gas flow between the intake port 9 (exhaust port 10) via the intake valve 11 (exhaust valve 12) substantially starts to occur. For example, the lift of the intake valve 11 (exhaust valve 12) increases at a substantially constant rate from a seated state of the valve (i.e., after passing a ramp part) and then sharply rises. The open timing of the intake valve 11 (exhaust valve 12) described here is the timing when the lift sharply rises. Specifically, this timing is when the lift of the intake valve 11 (exhaust valve 12) is about 0.14 mm. Similarly, the close timing of the intake valve 11 (exhaust valve 12) described here is not a timing when its lift becomes zero (0), but a timing when a gas flow between the intake port 9 (exhaust port 10) via the intake valve 11 (exhaust valve 12) substantially stops. For example, the lift of the intake valve 11 (exhaust valve 12) decreases relatively sharply and then further at a substantially constant rate toward zero (i.e., a so-called ramp part is set). The close timing of the intake valve 11 (exhaust valve 12) described here is the timing when the lift sharply drops. Specifically, this timing is when the lift of the intake valve 11 (exhaust valve 12) is about 0.14 mm.

The cylinder head 4 is provided with the injector 15 which injects the fuel (mainly gasoline) into the combustion chamber 6, and a spark plug 16 which ignites mixture gas containing the fuel injected into the combustion chamber 6 from the injector 15 and air introduced into the combustion chamber 6. The cylinder head 4 is further provided with an in-cylinder pressure sensor SN3 which detects pressure of the combustion chamber 6 (hereinafter, also referred to as "in-cylinder pressure").

As illustrated in FIG. 2, on a crown surface of the piston 5, a cavity 20 is formed by denting a relatively wide area of the piston 5, including a center part thereof, to the opposite side from the cylinder head 4 (downward). Further, a squish portion 21 comprised of an annular flat surface is formed in the crown surface of the piston 5 radially outward of the cavity 20.

The injector 15 is a multi-port injector having a plurality of nozzle ports at its tip portion, and the fuel is injected radially from the plurality of nozzle ports. "F" in FIG. 2 indicates fuel spray injected from the respective nozzle ports and, in the example of FIG. 2, the injector 15 has ten nozzle ports at an even interval in a circumferential direction thereof. The injector 15 is disposed in a center portion of a ceiling surface of the combustion chamber 6 so that its tip portion opposes to a center portion (a bottom center portion of the cavity 20) of the crown surface of the piston 5.

The spark plug 16 is disposed at a somewhat offset position to the intake side with respect to the injector 15. The tip portion (electrode portion) of the spark plug 16 is located at a position overlapping with the cavity 20 in the plan view.

As illustrated in FIG. 1, the intake passage 30 is connected to one side surface of the cylinder head 4 to communicate with the intake ports 9. Air (fresh air) taken in from an upstream end of the intake passage 30 is introduced into the combustion chamber 6 through the intake passage 30 and the intake port 9.

In the intake passage 30, an air cleaner 31 which removes foreign matters within the intake air, a throttle valve 32 which adjusts a flow rate of intake air, a booster 33 which pumps the intake air while compressing it, an intercooler 35 which cools the intake air compressed by the booster 33, and a surge tank 36 are provided in this order from the upstream side.

An airflow sensor SN4 which detects the flow rate of intake air, first and second intake air temperature sensors SN5 and SN7 which detect the temperature of the intake air, and first and second intake air pressure sensors SN6 and SN8 which detect pressure of the intake air are provided in various parts of the intake passage 30. The airflow sensor SN4 and the first intake air temperature sensor SN5 are provided in a portion of the intake passage 30 between the air cleaner 31 and the throttle valve 32, and detect the flow rate and the temperature of the intake air passing through this portion. The first intake air pressure sensor SN6 is provided in a portion of the intake passage 30 between the throttle valve 32 and the booster 33 (downstream of a connection port of an EGR passage 51 described later), and detects the pressure of the intake air passing through this portion. The second intake air temperature sensor SN7 is provided in a portion of the intake passage 30 between the booster 33 and the intercooler 35, and detects the temperature of intake air passing through this portion. The second intake air pressure sensor SN8 is provided in the surge tank 36 and detects the pressure of intake air in the surge tank 36.

The booster 33 is a mechanical booster (supercharger) mechanically linked to the engine body 1. Although the specific type of the booster 33 is not particularly limited, for example, any of known boosters, such as Lysholm type, Roots type, or centrifugal type, may be used as the booster 33.

An electromagnetic clutch 34 electrically switchable of its operation mode between "engaged" and "disengaged" is provided between the booster 33 and the engine body 1. When the electromagnetic clutch 34 is engaged, a driving force is transmitted from the engine body 1 to the booster 33 to enter a boosting state where boost by the booster 33 is performed. On the other hand, when the electromagnetic clutch 34 is disengaged, the transmission of the driving force is interrupted to enter a non-boosting state where the boost by the booster 33 is stopped. The electromagnetic clutch 34 and the device configured to drive the electromagnetic clutch 34 is one example of a "boost switching mechanism."

A bypass passage 38 which bypasses the booster 33 is provided in the intake passage 30. The bypass passage 38 connects the surge tank 36 to the EGR passage 51 described later. A bypass valve 39 is provided in the bypass passage 38.

The exhaust passage 40 is connected to the other side surface of the cylinder head 4 so as to communicate with the exhaust port 10. Burnt gas (exhaust gas) generated in the combustion chamber 6 is discharged outside through the exhaust port 10 and the exhaust passage 40.

A catalytic converter 41 is provided in the exhaust passage 40. The catalytic converter 41 is built therein with a three-way catalyst 41a which purifies hazardous components contained within the exhaust gas flowing through the exhaust passage 40 (HC, CO and $NO_x$), and a GPF (gasoline-particulate filter) 41b which captures particulate matter (PM) contained within the exhaust gas. Note that another catalytic converter built therein with a suitable catalyst, such as a three-way catalyst or a $NO_x$ catalyst, may be added downstream of the catalytic converter 41.

A linear $O_2$ sensor SN10 which detects the concentration of oxygen contained within the exhaust gas is provided in a portion of the exhaust passage 40 upstream of the catalyst converter 41. The linear $O_2$ sensor SN10 linearly changes its output value according to the oxygen concentration and an air-fuel ratio of the mixture gas is estimatable based on the output value of the linear $O_2$ sensor SN10.

The external EGR device 50 has the EGR passage 51 connecting the exhaust passage 40 to the intake passage 30, and an EGR cooler 52 and an EGR valve 53 provided in the EGR passage 51. The EGR passage 51 connects a portion of the exhaust passage 40 downstream of the catalytic converter 41 to a portion of the intake passage 30 between the throttle valve 32 and the booster 33. The EGR cooler 52 cools the exhaust gas recirculated from the exhaust passage 40 to the intake passage 30 through the EGR passage 51 by heat exchange. The EGR valve 53 is provided in the EGR passage 51 downstream of the EGR cooler 52 (the side close to the intake passage 30), and adjusts the flow rate of the exhaust gas flowing through the EGR passage 51. Hereinafter, the exhaust gas recirculated from the exhaust passage 40 into the combustion chamber 6 (cylinder 2) through the EGR passage 51 is referred to as the external EGR gas.

A pressure difference sensor SN9 which detects a difference between pressure upstream of the EGR valve 53 and pressure downstream thereof is provided in the EGR passage 51.

(2) Control System

Figure 4:
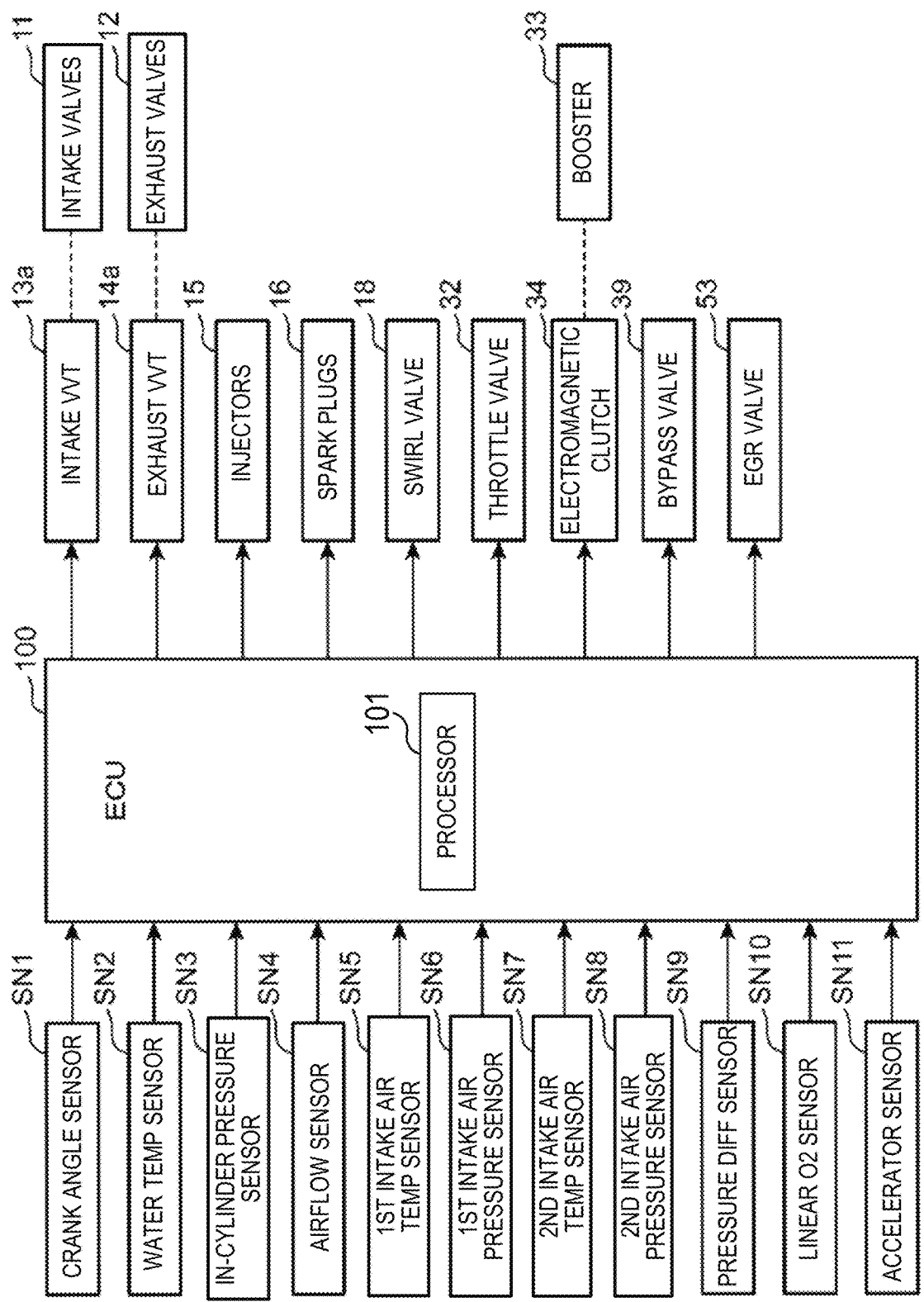
FIG. 4 is a block diagram illustrating a control system of the engine.

FIG. 4 is a block diagram illustrating a control system of the engine. An ECU (electronic control unit) 100 illustrated in FIG. 4 is a microprocessor which comprehensively controls the engine, and comprised of a well-known processor 101 (e.g. a central processing unit (CPU)) having associated ROM and RAM, etc.

The ECU 100 receives detection signals from various sensors. For example, the ECU 100 is electrically connected to the crank angle sensor SN1, the water temperature sensor SN2, the in-cylinder pressure sensor SN3, the airflow sensor SN4, the first and second intake air temperature sensors SN5 and SN7, the first and second intake air pressure sensors SN6 and SN8, the pressure difference sensor SN9, and the linear $O_2$ sensor SN10, which are described above. The ECU 100 sequentially receives the information detected by these sensors (i.e., the crank angle, the engine speed, the engine water temperature, the in-cylinder pressure, the intake air flow rate, the intake air temperatures, the intake air pressures, the difference in pressure between the upstream and downstream sides of the EGR valve 53, the oxygen concentration of the exhaust gas, etc.).

Further, an accelerator sensor SN11 which detects an opening of an accelerator pedal controlled by a vehicle driver driving the vehicle is provided in the vehicle, and a detection signal from the accelerator sensor SN11 is also inputted to the ECU 100.

The ECU 100 controls various components of the engine while executing various determinations and calculations based on the input signals from the various sensors. That is, the ECU 100 is electrically connected to the intake VVT 13a, the exhaust VVT 14a, the injector 15, the spark plug 16, the swirl valve 18, the throttle valve 32, the electromagnetic clutch 34, the bypass valve 39, the EGR valve 53, etc., and outputs control signals to these components based on various calculation results. Note that the ECU 100 as described above is one example of a "controller."

(3) Control According to Operating State

Figure 5A:
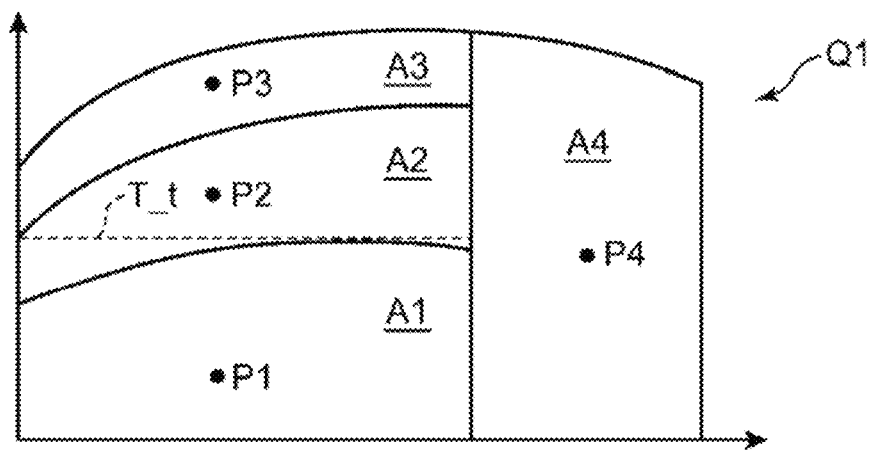
Figure 5B:
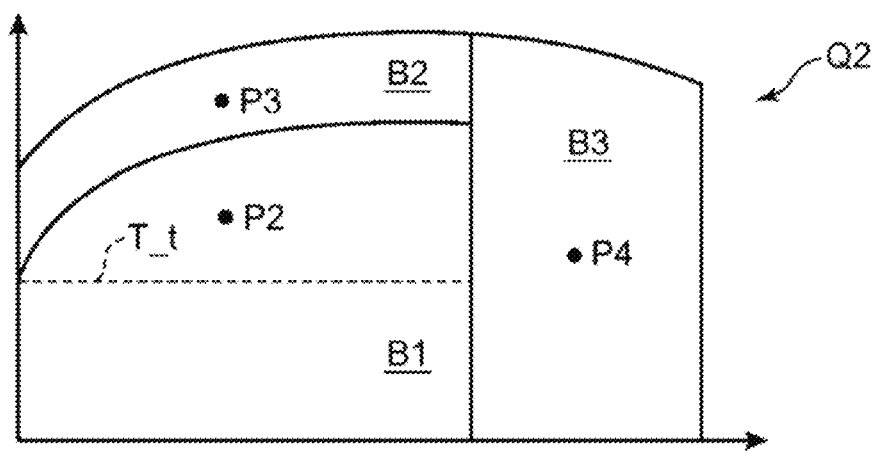
Figure 5C:
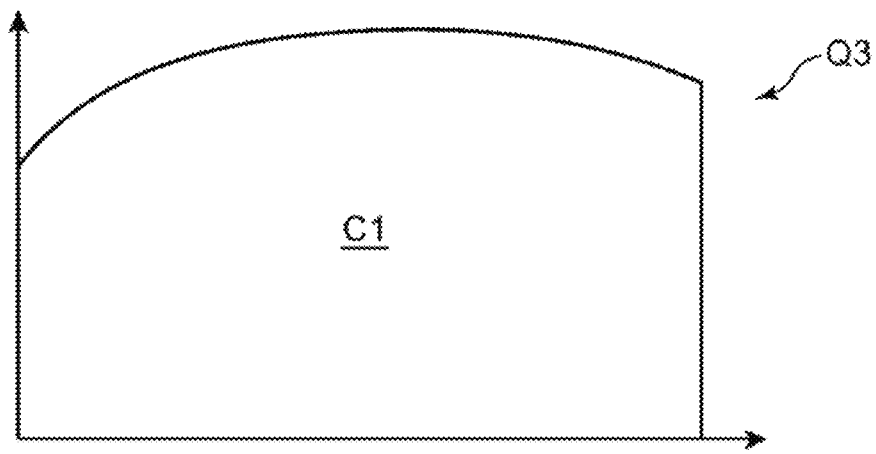

FIGS. 5A to 5C are operation maps illustrating a difference in control according to a progression of a warm-up of the engine and the engine speed and load. In this embodiment, different operation maps Q1 to Q3 are prepared corresponding to three stages including a warmed-up state where the warm-up of the engine is completed, a partially warmed-up state where the engine is in process of warming up, and a cold state where the engine is not warmed up. Hereinafter, the operation map Q1 used in the warmed-up state is referred to as the first operation map, the operation map Q2 used in the partially warmed-up state is referred to as the second operation map, and the operation map Q3 used in the cold state is referred to as the third operation map.

Note that in the below description, the engine load being high (low) is equivalent to a required torque of the engine being high (low). Further in the below description, phrases like "early stage," "middle stage," and "late stage" of a certain stroke or phrases like "early half" and "latter half" of a certain stroke may be used to specify a timing of a fuel injection or a spark-ignition, and these phrases are based on the following definitions. That is, here, three periods formed by evenly dividing any stroke, such as intake stroke or compression stroke, are defined as "early stage," "middle stage," and "late stage," respectively. Therefore, for example, (i) the early stage, (ii) the middle stage, and (iii) the late stage of the compression stroke indicate (i) a range between 180° CA and 120° CA before TDC (BTDC) of the compression stroke, (ii) a range between 120° CA and 60° CA BTDC, (iii) a range between 60° CA and 0° CA BTDC, respectively. Similarly, here, two periods formed by evenly dividing any stroke, such as the intake stroke or the compression stroke, are defined as "early half" and "latter half," respectively. Therefore, for example, (iv) the early half and (v) the latter half of the intake stroke indicate (iv) a range between 360° CA and 270° CA BTDC, and (v) a range between 270° CA and 180° CA BTDC, respectively.

Figure 6:
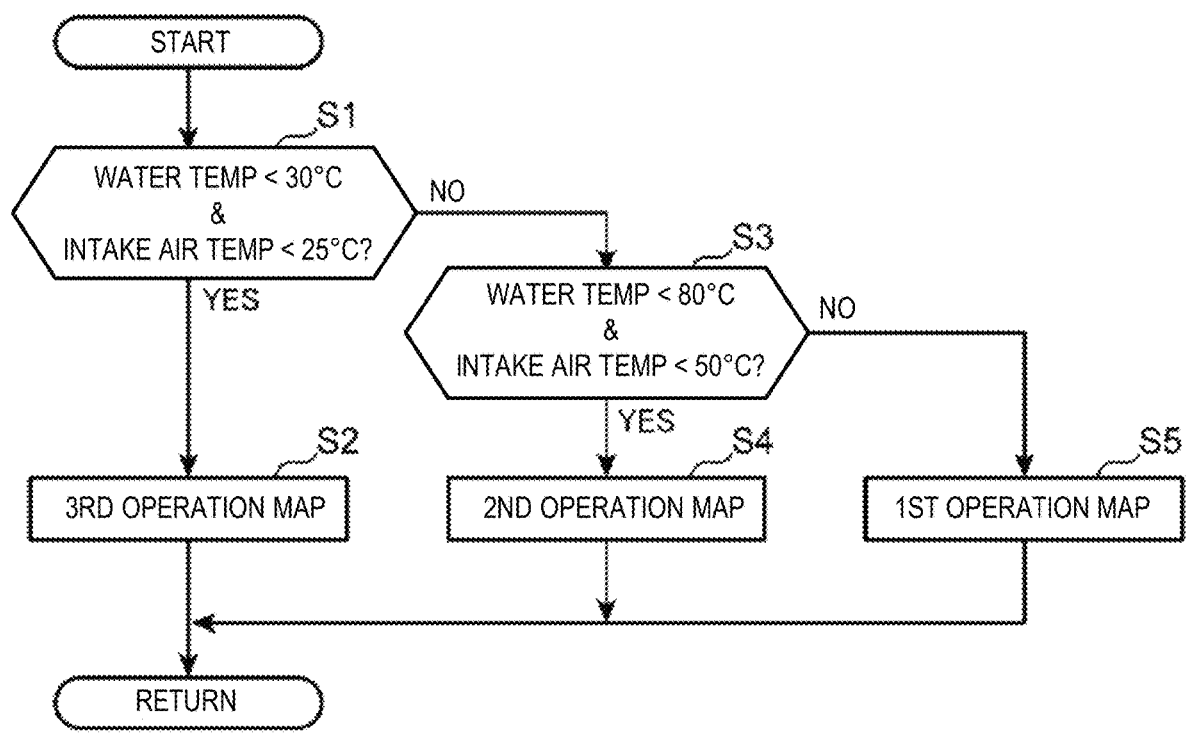
FIG. 6 is a flowchart illustrating a procedure for selecting a suitable map from the first to third operation maps.

FIG. 6 is a flowchart illustrating a procedure for selecting a suitable map from the first to third operation maps Q1 to Q3. Once the control illustrated in this flowchart is started, at S1, the ECU 100 determines whether (i) the engine water temperature is below 30° C. and (ii) the intake air temperature is below 25° C. are both satisfied, based on the engine water temperature detected by the water temperature sensor SN2 and the intake air temperature detected by the second intake air temperature sensor SN7.

If S1 is YES and it is confirmed that (i) and (ii) are satisfied, i.e., both "engine water temperature<30° C." and "intake air temperature<25° C." are satisfied and the engine is in the cold state, the ECU 100 shifts to S2 to determine the third operation map Q3 illustrated in FIG. 5C as the operation map to be used.

On the other hand, if S1 is NO and it is confirmed that at least one of (i) and (ii) is not satisfied, the ECU 100 shifts to S3 to determine whether (iii) the engine water temperature is below 80° C. and (iv) the intake air temperature is below 50° C. are both satisfied, based on the engine water temperature detected by the water temperature sensor SN2 and the intake air temperature detected by the second intake air temperature sensor SN7.

If S3 is YES and it is confirmed that (iii) and (iv) are satisfied, i.e., at least one of "engine water temperature≥30° C." and "intake air temperature≥25° C." is satisfied, and both "engine water temperature<80° C." and "intake air temperature<50° C." are satisfied, which means that the engine is in the partially warmed-up state, the ECU 100 shifts to S4 to determine the second operation map Q2 illustrated in FIG. 5B as the operation map to be used.

On the other hand, if S3 is NO and it is confirmed that at least one of (iii) and (iv) is not satisfied, i.e., at least one of "engine water temperature≥80° C." and "intake air temperature≥50° C." is satisfied, which means that the engine is in the warmed-up state (warm-up completed state), the ECU 100 shifts to S5 to determine the first operation map Q1 illustrated in FIG. 5A as the operation map to be used.

Next, details of controls (a difference in combustion control according to the engine speed/load) defined by the operation maps Q1 to Q3 in the cold state, the partially warmed-up state, and the warmed-up state are described, respectively.

(3-1) Control in Cold State

A combustion control in the cold state of the engine is described with reference to the third operation map Q3 (FIG. 5C). In the cold state of the engine, a control for mixing the fuel with air to form the mixture gas and performing the SI combustion with the mixture gas is executed within an entire operating range C1. The explanation of the control in the cold state is omitted since it is similar to the combustion control of a general gasoline engine.

(3-2) Control in Partially Warmed-Up State

A combustion control in the partially warmed-up state of the engine is described based on the second operation map Q2 (FIG. 5B). As illustrated in FIG. 5B, when the engine is in the partially warmed-up state, the operating range of the engine is mainly divided into three operating ranges B1 to B3. When the three ranges are a first partially warmed-up range B1, a second partially warmed-up range B2, and a third partially warmed-up range B3, the third partially warmed-up range B3 is a high engine speed range. The first partially warmed-up range B1 is a low and medium speed, low load range extending on the lower speed side of the third partially warmed-up range B3, excluding the high load side. The second partially warmed-up range B2 is a range other than the first and third partially warmed-up ranges B1 and B3 (i.e., a low and medium speed, high load range).

(a) First Partially Warmed-Up Range

Within the first partially warmed-up range B1, the SPCCI combustion combining the SI combustion and the CI combustion is performed. The SI combustion is a mode in which the mixture gas is ignited by the spark plug 16 and is then forcibly combusted by flame propagation which spreads the combusting region from the ignition point, and the CI combustion is a mode in which the mixture gas is combusted by self-ignition in an environment increased in temperature and pressure due to the compression of the piston 5. The SPCCI combustion combining the SI combustion and the CI combustion is a combustion mode in which the SI combustion is performed on a portion of the mixture gas inside the combustion chamber 6 by the spark-ignition performed in an environment immediately before the mixture gas self-ignites, and after the SI combustion, the CI combustion is performed on the remaining mixture gas in the combustion chamber 6 by self-ignition (by the further increase in temperature and pressure accompanying the SI combustion). Note that "SPCCI" is an abbreviation of "SPark Controlled Compression Ignition" and the SPCCI combustion is one example of "partial compression-ignition combustion."

Figure 7:
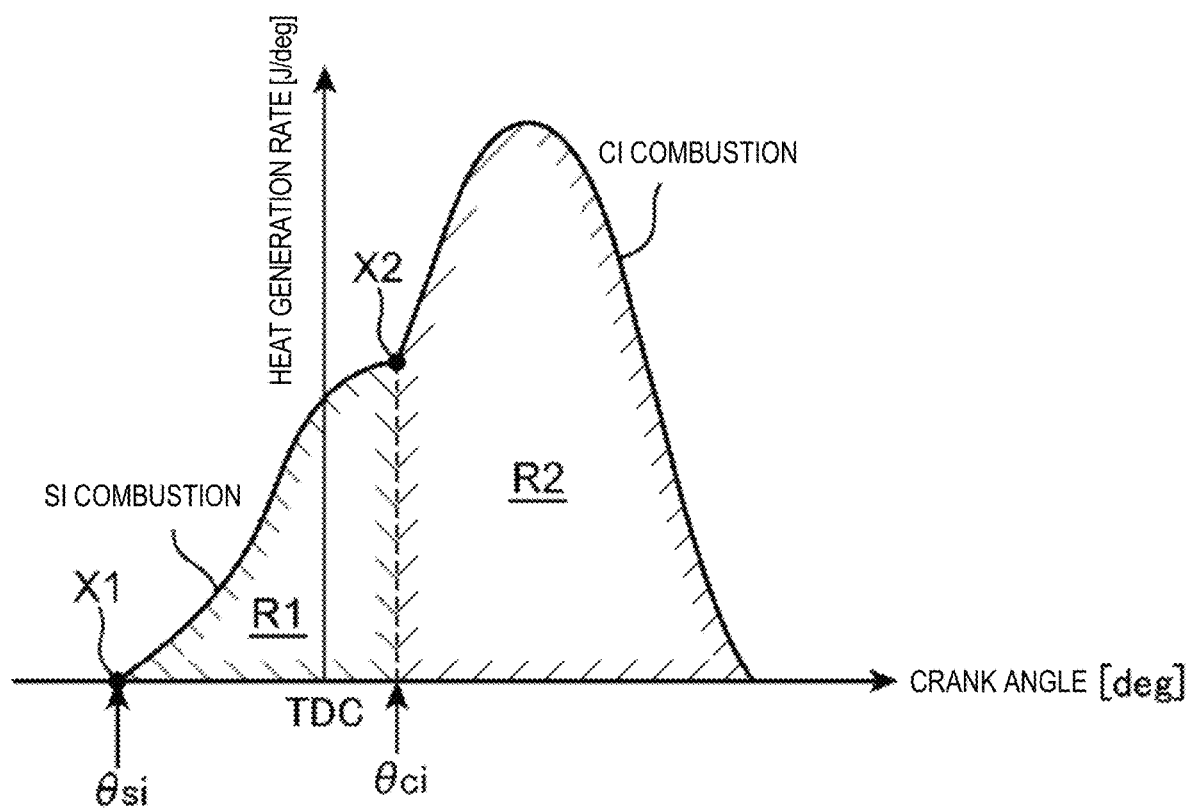
FIG. 7 is a chart illustrating a waveform of a heat generation rate in SPCCI combustion (partial compression-ignition combustion).

The SPCCI combustion has a characteristic that the heat generation in the CI combustion is faster than that in the SI combustion. For example, as illustrated in FIG. 7 described later, a waveform of a heat generation rate caused by the SPCCI combustion has a shape in which a rising slope in an early stage of the combustion which corresponds to the SI combustion is shallower than a rising slope caused corresponding to the CI combustion occurring subsequently. In other words, the waveform of the heat generation rate caused by the SPCCI combustion is formed to have a first heat generation rate portion formed by the SI combustion and having a relatively shallow rising slope, and a second heat generation rate portion formed by the CI combustion and having a relatively steep rising slope, which are next to each other in this order. Further, corresponding to the tendency of such a heat generation rate, in the SPCCI combustion, a pressure increase rate ($dp/d\theta$) inside the combustion chamber 6 caused by the SI combustion is lower than that in the CI combustion.

When the temperature and pressure inside the combustion chamber 6 rise due to SI combustion, the unburnt mixture gas self-ignites and CI combustion starts. As illustrated in FIG. 7, the slope of the waveform of the heat generation rate changes from shallow to steep at the timing of self-ignition (that is, the timing when CI combustion starts). That is, the waveform of the heat generation rate caused by SPCCI combustion has a flection point at a timing when CI combustion starts (indicated by an "X2" in FIG. 7).

After CI combustion starts, SI combustion and CI combustion are performed in parallel. In CI combustion, since the combustion speed of the mixture gas is faster than that in SI combustion, the heat generation rate becomes relatively high. However, since CI combustion is performed after TDC of compression stroke, the slope of the waveform of the heat generation rate does not become excessive. That is, after TDC of compression stroke, since the motoring pressure decreases due to the piston 5 descending, the rise of the heat generation rate is prevented, which avoids excessive $dp/d\theta$ in CI combustion. In SPCCI combustion, due to CI combustion being performed after SI combustion as described above, it is unlikely for $dp/d\theta$ which is an index of combustion noise to become excessive, and the combustion noise is reduced compared to performing CI combustion alone (in the case where CI combustion is performed on all the fuel).

SPCCI combustion ends as CI combustion finishes. Since the combustion speed of CI combustion is faster than that of SI combustion, the combustion end timing is advanced compared to performing SI combustion alone (in the case where SI combustion is performed on all of the fuel). In other words, SPCCI combustion brings the combustion end timing closer to TDC of compression stroke, on the expansion stroke. Thus, SPCCI combustion improves fuel efficiency compared to SI combustion alone.

Within the first partially warmed-up range B1, when the spark plug 16 performs the ignition (when the mixture gas starts to combust), an environment in which the burnt gas (combusted gas) exists within the combustion chamber 6, a gas-fuel ratio (G/F) which is a weight ratio between the entire gas (G) and the fuel (F) within the combustion chamber 6 (cylinder 2) is increased to be higher than a stoichiometric air-fuel ratio (14.7:1), and an air-fuel ratio (A/F) which is a ratio between the air (A) and the fuel (F) within the combustion chamber 6 (cylinder 2) substantially matches the stoichiometric air-fuel ratio (hereinafter, referred to as G/F lean environment) is formed and a control for performing SPCCI combustion of the mixture gas is executed. More specifically, the gas-fuel ratio (G/F) is $18:1 \leq G/F \leq 50:1$. By setting this range, the stability of SI combustion is secured, the controllability of the start timing of CI combustion is secured, and combustion noise is also reduced.

In order to realize SPCCI combustion in such a G/F lean environment, within the first partially warmed-up range B1, various components of the engine are controlled by the ECU 100 as follows.

Figure 8:
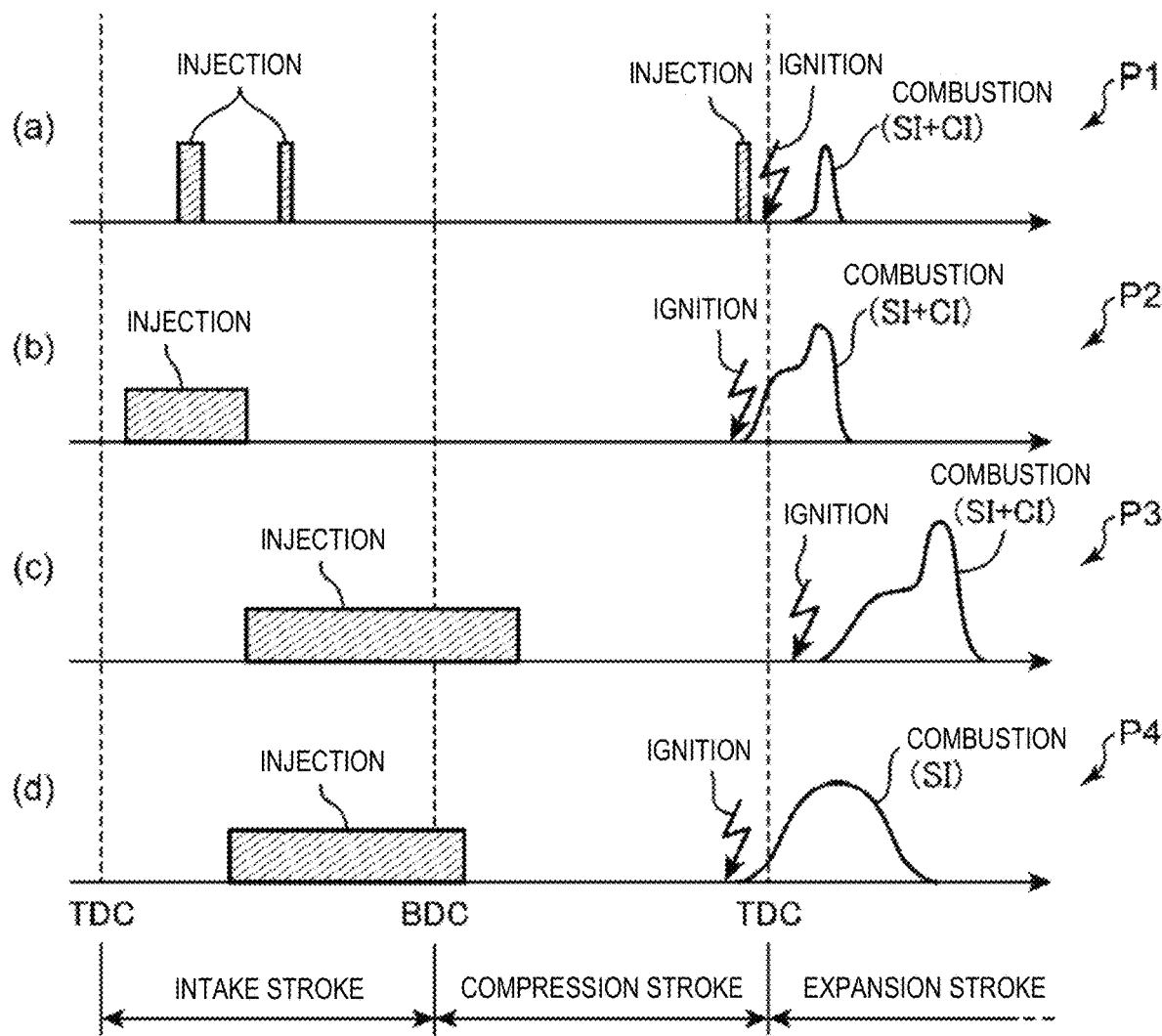
FIG. 8 shows time charts schematically illustrating a combustion control executed in respective operating ranges of the engine.

The injector 15 performs at least a single fuel injection on the intake stroke. For example, at an operation point P2 within the first partially warmed-up range B1, the injector 15 performs the single fuel injection for supplying the entire amount of fuel to be injected in one cycle, during the intake stroke as illustrated in a chart (b) of FIG. 8.

The spark plug 16 ignites the mixture gas near TDC of compression stroke. For example, at the operation point P2, the spark plug 16 ignites the mixture gas at a slightly advanced timing than TDC of compression stroke. This ignition triggers SPCCI combustion, a portion of the mixture gas in the combustion chamber 6 is combusted through flame propagation (SI combustion), and then the remaining mixture gas is combusted by self-ignition (CI combustion).

The opening of the throttle valve 32 is set so that an air amount equivalent to the stoichiometric air-fuel ratio is introduced into the combustion chamber 6 through the intake passage 30, i.e., so that the air-fuel ratio (A/F) which is a weight ratio between air (fresh air) and the fuel inside the combustion chamber 6 substantially matches the stoichiometric air-fuel ratio (14.7:1). On the other hand, within the first partially warmed-up range B1, the open timing IVO of the intake valve 11, a close timing EVC of the exhaust valve 12 and the opening of the EGR valve 53 are adjusted so that the external EGR gas and/or the internal EGR gas, which is the burnt gas, flows into (remains inside) the combustion chamber 6. Thus, within the first partially warmed-up range B1, the gas-fuel ratio is increased to be higher than the stoichiometric air-fuel ratio. The internal EGR gas is, within the burnt gas generated inside the combustion chamber 6, the portion which is not the external EGR gas, in other words, it is not the burnt gas recirculated into the combustion chamber 6 through the EGR passage 51 but gas remaining inside the combustion chamber 6 without being discharged to the EGR passage 51 (including gas returned back to the combustion chamber 6 after being discharged to the intake port 9 and/or the exhaust port 10).

An opening of the EGR valve 53 is controlled to achieve a target external EGR ratio variably set within a substantial range of 0-40%. Note that the external EGR ratio used here is a weight ratio of exhaust gas recirculated to the combustion chamber 6 through the EGR passage 51 (external EGR gas) to all the gas inside the combustion chamber 6, and the target external EGR ratio is a target value of the external EGR ratio.

Figure 9:
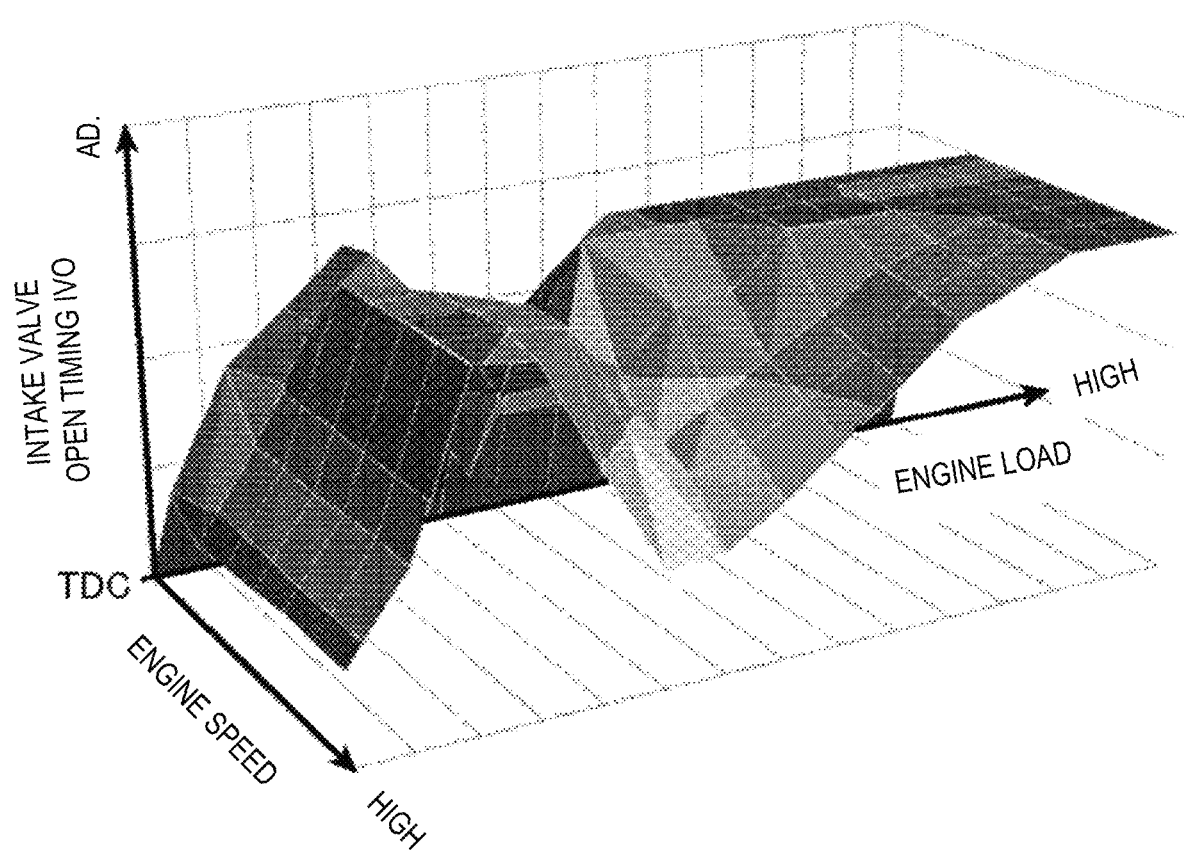
FIG. 9 is a three-dimensional map illustrating one specific example of an open timing of an intake valve set within a first partially warmed-up range.
Figure 10:
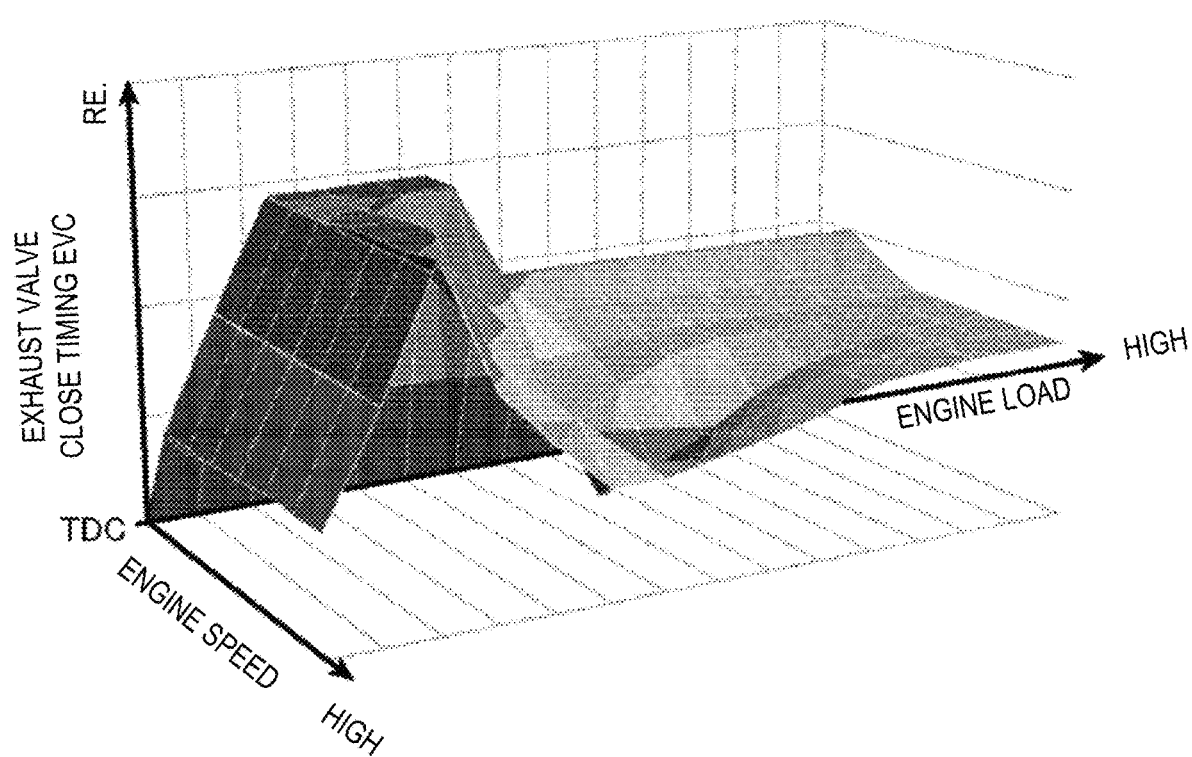
FIG. 10 is a three-dimensional map illustrating one specific example of a close timing of an exhaust valve set within the first partially warmed-up range.

The intake VVT 13a changes the open timing IVO of the intake valve 11 (intake open timing IVO) according to the engine speed and the engine load as illustrated in FIG. 9. The exhaust VVT 14a changes the close timing EVC of the exhaust valve 12 (exhaust close timing EVC) according to the engine speed and the engine load as illustrated in FIG. 10. These FIGS. 9 and 10 are three-dimensional maps illustrating specific examples of the open timing IVO of the intake valve 11 (the close timing EVC of the exhaust valve 12) with respect to the engine speed and the engine load. The open and close timings of the intake valve 11 and the close timing of the exhaust valve 12 within the first partially warmed-up range B1 will be described later in detail.

The booster 33 is in an OFF state when the engine load is below a given boosting load T_t. On the other hand, within the first partially warmed-up range B1, the booster 33 is in an ON state when the engine load is above the boosting load T_t. When the booster 33 is in the OFF state, the electromagnetic clutch 34 is disengaged to disconnect the booster 33 from the engine body 1 and fully open the bypass valve 39 so as to stop the boost by the booster 33 (enter a non-boosting state). On the other hand, when the booster 33 is in the ON state, the electromagnetic clutch 34 is engaged to connect the booster 33 to the engine body 1 so as to boost by the booster 33 (enter a boosting state). Here, the opening of the bypass valve 39 is controlled so that the pressure in the surge tank 36 (boosting pressure) detected by the second intake air pressure sensor SN7 matches a given target pressure determined for each operating condition of the engine (a condition such as the engine speed and the engine load). For example, as the opening of the bypass valve 39 increases, the flow rate of the intake air which flows back to the upstream side of the booster 33 through the bypass passage 38 increases, and as a result, the pressure of the intake air introduced into the surge tank 36, that is, the boosting pressure, becomes low. By adjusting the backflow amount of the intake air in this manner, the bypass valve 39 controls the boosting pressure to the target pressure.

Within the first partially warmed-up range B1, the opening of the swirl valve 18 is adjusted to form a relatively weak swirl flow. For example, the swirl valve 18 is set to be about half open (50%) or have a larger opening.

(b) Second Partially Warmed-Up Range

Within the second partially warmed-up range B2, the control for performing SPCCI combustion of the mixture gas is executed in the environment in which the air-fuel ratio inside the combustion chamber 6 is slightly richer (an excess air ratio λ≤1) than the stoichiometric air-fuel ratio. In order to realize SPCCI combustion in such a rich environment, within the second partially warmed-up range B2, various components of the engine are controlled by the ECU 100 as follows.

The injector 15 injects all or a majority of the fuel for one combustion cycle, during the intake stroke. For example, at an operation point P3 within the second partially warmed-up range B2, the injector 15 injects the fuel over a continuous period overlapping with a latter half of the intake stroke, more specifically, a continuous period from the latter half of the intake stroke to an early half of the compression stroke, as illustrated in the chart (c) of FIG. 8.

The spark plug 16 ignites the mixture gas near TDC of compression stroke. For example, at the operation point P3, the spark plug 16 ignites the mixture gas at a slightly retarded timing than TDC of compression stroke.

The booster 33 is controlled to be ON and performs the boost. The boosting pressure here is adjusted by the bypass valve 39.

The intake VVT 13a and the exhaust VVT 14a set valve operation timings of the intake and exhaust valves 11 and 12 so that the internal EGR gas does not remain inside the combustion chamber 6 (the internal EGR is substantially stopped). The throttle valve 32 is fully opened. The opening of the EGR valve 53 is controlled so that the air-fuel ratio (A/F) in the combustion chamber 6 becomes the stoichiometric air-fuel ratio or slightly richer (λ≤1). For example, the EGR valve 53 adjusts the amount of the exhaust gas recirculated through the EGR passage 51 (external EGR gas) so that the air-fuel ratio becomes between 12:1 and 14:1. Note that near the highest engine load, the EGR valve 53 may be closed to substantially stop the external EGR. The swirl valve 18 is set to have an intermediate opening which is larger than that within the first partially warmed-up range B1 but smaller than a largest (full) opening.

(c) Third Partially Warmed-Up Range

Within the third partially warmed-up range B3, a relatively traditional SI combustion is performed. In order to realize SI combustion, within the third partially warmed-up range B3, various components of the engine are controlled by the ECU 100 as follows.

The injector 15 at least injects the fuel over a given period overlapping with the intake stroke. For example, at an operation point P4 within the third partially warmed-up range B3, the injector 15 injects the fuel over a continuous period from the intake stroke to the compression stroke, as illustrated in the chart (d) of FIG. 8.

The spark plug 16 ignites the mixture gas near TDC of compression stroke. For example, at the operation point P4, the spark plug 16 ignites the mixture gas at a slightly advanced timing than TDC of compression stroke. Further, this ignition triggers SI combustion, and all the mixture gas in the combustion chamber 6 combusts through flame propagation.

The booster 33 is controlled to be ON and performs the boost. The boosting pressure here is adjusted by the bypass valve 39. The throttle valve 32 is fully opened. The opening of the EGR valve 53 is controlled so that the air-fuel ratio (A/F) in the combustion chamber 6 becomes the stoichiometric air-fuel ratio or slightly richer (λ≤1). The swirl valve 18 is fully opened. Thus, not only the first intake port 9A is but also the second intake port 9B is fully opened and charging efficiency of the engine improves.

(3-3) Control in Warmed-Up State

As illustrated in FIG. 5A, when the engine is in the warmed-up state, the operating range of the engine is mainly divided into four operating ranges A1 to A4. When the four operating ranges are a first warmed-up range A1, a second warmed-up range A2, a third warmed-up range A3 and a fourth warmed-up range A4, the second warmed-up range A2 corresponds to a high load segment of the first partially warmed-up range B1, the first warmed-up range A1 corresponds to the first partially warmed-up range B1 without the second warmed-up range A2, the third warmed-up range A3 corresponds to the second partially warmed-up range B2, and the fourth warmed-up range A4 corresponds to the third partially warmed-up range B3.

(a) First Warmed-Up Range

Within the first warmed-up range A1, a control is executed in which SPCCI combustion of the mixture gas is performed while setting the A/F higher than the stoichiometric air-fuel ratio (14.7:1), so as to keep an amount of $NO_x$ generated by the combustion small and improve fuel efficiency. That is, SPCCI combustion is performed while setting the excess air ratio $\lambda>1$ inside the combustion chamber 6. The A/F within the first warmed-up range A1 is set variably, for example within a range of 20 to below 35, so that the amount of $NO_x$ generated by the combustion is kept sufficiently small. A target air-fuel ratio within the first warmed-up range A1 is generally set to be higher as the engine load (required torque) increases.

In order to realize SPCCI combustion in such an environment where the air-fuel ratio is higher than the stoichiometric air-fuel ratio (hereinafter, suitably referred to as an "A/F lean environment"), within the first warmed-up range A1, various components of the engine are controlled by the ECU 100 as follows.

The injector 15 injects the fuel by splitting it into a plurality of injections from the intake stroke to the compression stroke. For example, at an operation point P1 at which the engine speed and load are relatively low within the first warmed-up range A1, the injector 15 injects the majority of the fuel for one cycle in two portions from an early stage to a middle stage of the intake stroke and the remaining fuel in a final stage of the compression stroke (a total of three injections), as illustrated in the chart (a) of FIG. 8.

The spark plug 16 ignites the mixture gas near TDC of compression stroke. For example, at the operation point P1, the spark plug 16 ignites the mixture gas at a slightly advanced timing than TDC of compression stroke. This ignition triggers SPCCI combustion, a portion of the mixture gas in the combustion chamber 6 is combusted through flame propagation (SI combustion), and then the remaining mixture gas is combusted by self-ignition (CI combustion).

The booster 33 is in the OFF state within the substantially entire first warmed-up range A1. The throttle valve 32 is fully opened or has a similar opening within the entire first warmed-up range A1. Thus, a large amount of air is introduced into the combustion chamber 6 to increase the air-fuel ratio inside the combustion chamber 6.

Figure 11:
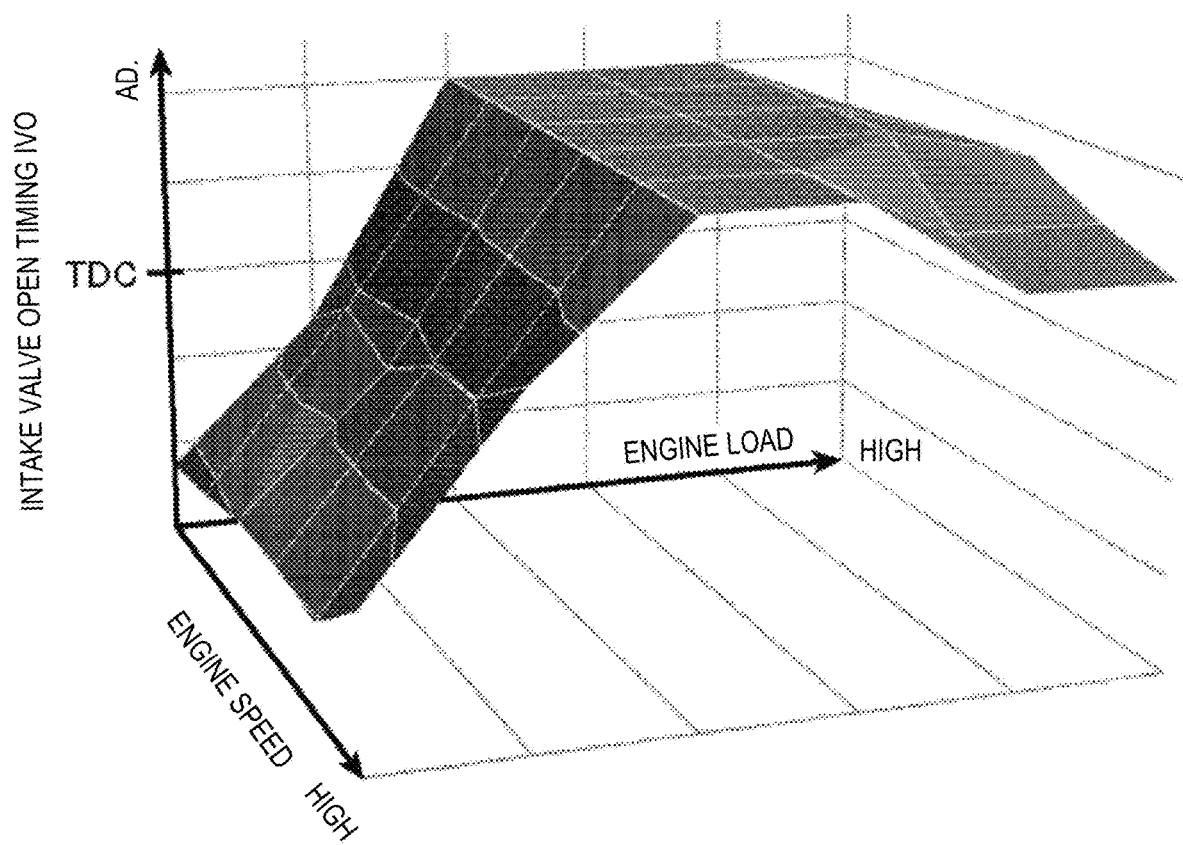
FIG. 11 is a three-dimensional map illustrating one specific example of the open timing of the intake valve set within a first warmed-up range.

The intake VVT 13a changes the open timing IVO of the intake valve 11 according to the engine speed and the engine load as illustrated in FIG. 11.

Specifically, substantially within a low load range where the engine load is low, the open timing IVO of the intake valve 11 is advanced as the engine load increases. For example, the intake open timing IVO is set to be retarded than TDC of the exhaust stroke at a lowest engine load and is advanced to a most advanced timing as the engine load increases. Further, within a medium load range where the engine load is relatively high, the intake open timing IVO is kept at the most advanced timing regardless of the engine load. Moreover, within a high load range where the engine load is even higher, the intake open timing IVO is retarded as the engine load increases on a more advancing side of TDC of the exhaust stroke. Note that similar to the intake open timing IVO, the close timing IVC of the intake valve 11 is changed with respect to the engine load on a more retarding side of the BDC of the intake stroke.

Figure 12:
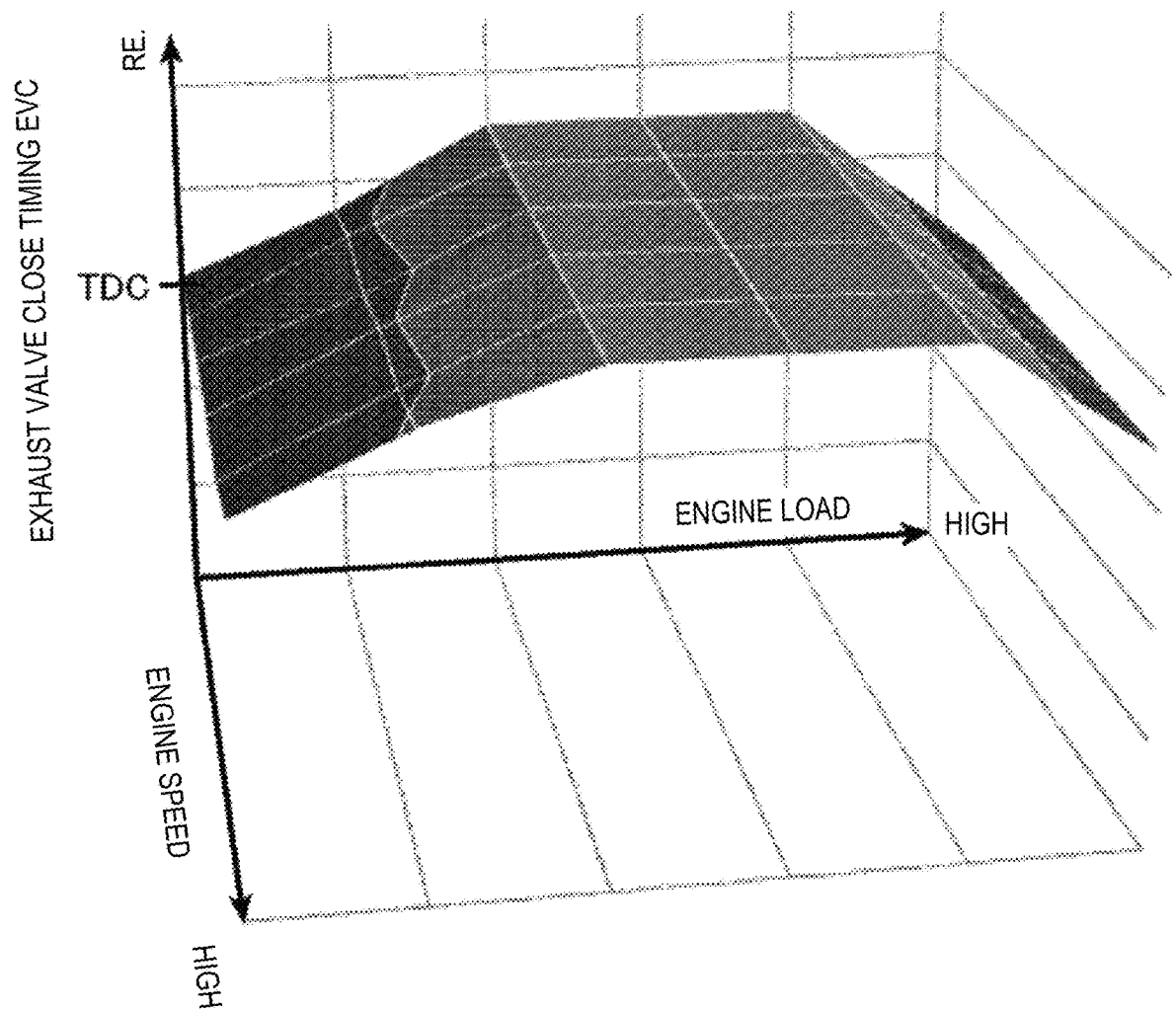
FIG. 12 is a three-dimensional map illustrating one specific example of the close timing of the exhaust valve set within the first warmed-up range.

The exhaust VVT 14a changes the close timing EVC of the exhaust valve 12 according to the engine speed and the engine load as illustrated in FIG. 12.

Specifically, the exhaust close timing EVC is set on the retarding side of TDC of the exhaust stroke. Further, within the low load range, the exhaust close timing EVC is retarded as the engine load increases. For example, the exhaust close timing EVC is set to TDC of the exhaust stroke at the lowest engine load, and its retarded amount from TDC of the exhaust stroke is increased as the engine load increases. Moreover, within the medium load range, the exhaust close timing EVC is kept fixed regardless of the engine load. Furthermore, within the high load range, the exhaust close timing EVC is advanced as the engine load increases. Note that the open timing EVO of the exhaust valve 12 is changed with respect to the engine load similarly to the exhaust close timing EVC.

The opening of the EGR valve 53 is controlled to achieve a target external EGR ratio variably set within a substantial range of 0-20%. The target external EGR ratio is increased as the engine speed or the engine load increases.

Within the first warmed-up range A1, the opening of the swirl valve 18 is set smaller than the half-opened state (50%). By reducing the opening of the swirl valve 18 as above, majority of the intake air introduced into the combustion chamber 6 is from the first intake port 9A (the intake port on the side where the swirl valve 18 is not provided), and a strong swirl flow is formed inside the combustion chamber 6. This swirl flow grows during the intake stroke and remains until the middle of the compression stroke, to promote stratification of the fuel. That is, a concentration difference that the fuel in the center portion of the combustion chamber 6 concentrates more than outside thereof (outer circumferential portion) is formed. For example, within the first warmed-up range A1, the air-fuel ratio in the center portion of the combustion chamber 6 is set between 20:1 and 30:1 by the effect of the swirl flow, and the air-fuel ratio in the outer circumferential portion of the combustion chamber 6 is set to 35:1 or higher. Within the first warmed-up range A1, a target swirl opening is variably set to substantially 20-40%, and its value is increased as the engine speed or the engine load increases.

Note that the swirl ratio of the swirl valve 18 of the engine of this embodiment is set slightly higher than 1.5:1 when its opening is 40%, and when the swirl valve 18 is fully closed (0%), the swirl ratio is increased to approximately 6:1. "Swirl ratio" is defined as a value obtained by dividing a value which is obtained from measuring an intake flow lateral angular speed for each valve lift and integrating the value, by an angular speed of a crankshaft. As described above, the opening of the swirl valve 18 is substantially controlled between 20 and 40% during the operation within the first warmed-up range A1. From this, in this embodiment, the opening of the swirl valve 18 within the first warmed-up range A1 is set so that the swirl ratio inside the combustion chamber 6 becomes 1.5 or higher.

(b) Second Warmed-Up Range

Within the second warmed-up range A2, similar to the first partially warmed-up range B1, the control for performing SPCCI combustion of the mixture gas is executed in the environment in which the air-fuel ratio inside the combustion chamber 6 is substantially the stoichiometric air-fuel ratio ($\lambda=1$). Since the control within the second warmed-up range A2 is basically similar to the control described in (3-2(a)) (the control within the first partially warmed-up range B1), its description is omitted here.

(c) Third Warmed-Up Range

Within the third warmed-up range A3, similar to the second partially warmed-up range B2, the control for performing SPCCI combustion of the mixture gas is executed in the environment in which the air-fuel ratio inside the combustion chamber 6 is slightly richer than the stoichiometric air-fuel ratio ($\lambda \leq 1$). Since the control within the third warmed-up range A3 is basically similar to the control described in (3-2(b)) (the control within the second partially warmed-up range B2), its description is omitted here.

(d) Fourth Warmed-Up Range

Within the fourth warmed-up range A4, similar to the third partially warmed-up range B3, the relatively traditional SI combustion is performed. Since the control within the fourth warmed-up range A4 is basically similar to the control described in (3-2(c)) (the control within the third partially warmed-up range B3), its description is omitted here.

(4) Setting of Open and Close Timings of Intake Valve and Exhaust Valve within First Partially Warmed-Up Range The open and close timings of the intake valve 11 and the exhaust valve 12 set within the first partially warmed-up range B1 (within an execution range of SPCCI combustion in a G/F lean environment) are described in detail.

(a) Open and Close Timing of Intake Valve

Figure 13:
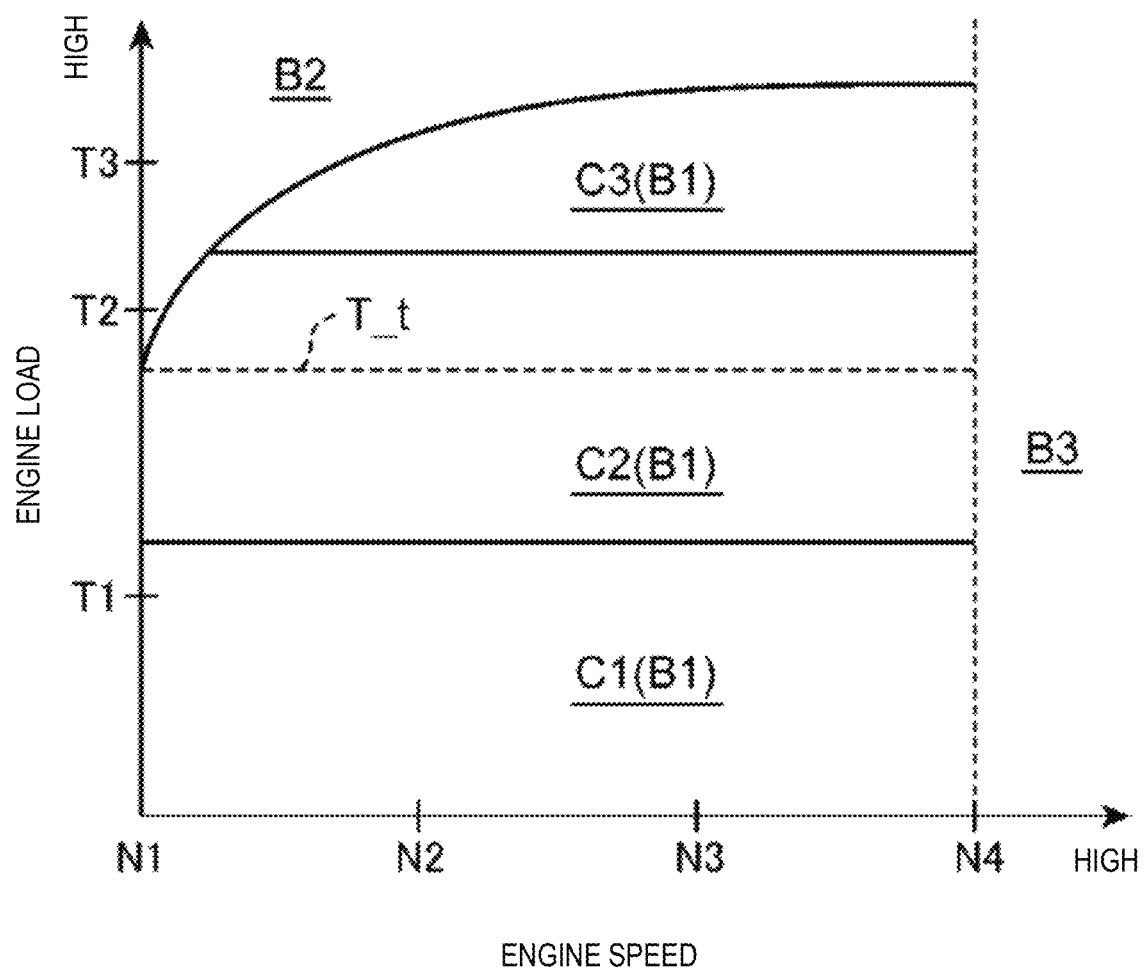
FIG. 13 is a part of FIG. 5B, and is an enlarged view illustrating the first partially warmed-up range.

FIG. 13 is a part of FIG. 5B, and is an enlarged view illustrating a first partially warmed-up range B1.

Figure 14:
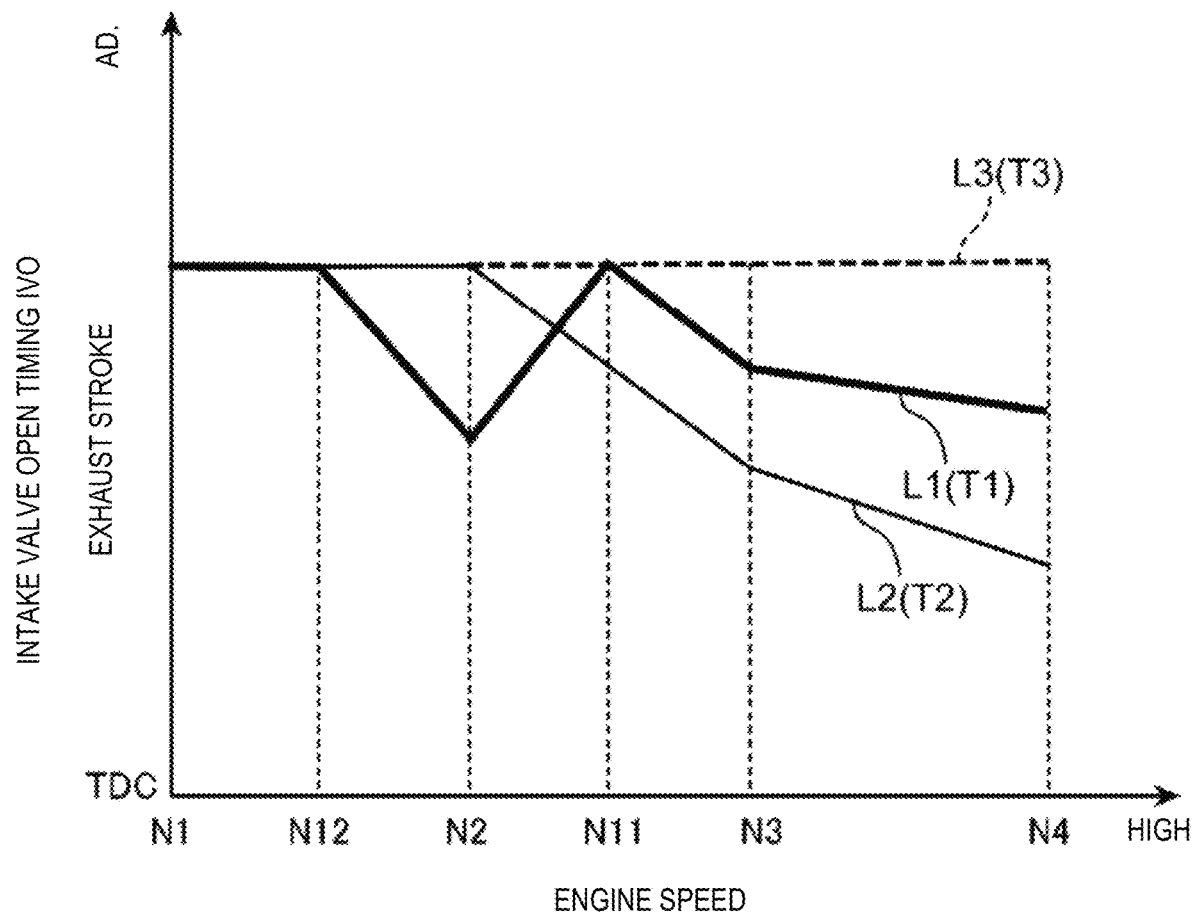
FIG. 14 is a chart illustrating a relationship between the engine speed and the open timing of the intake valve set at respective engine loads within the first partially warmed-up range.
Figure 15:
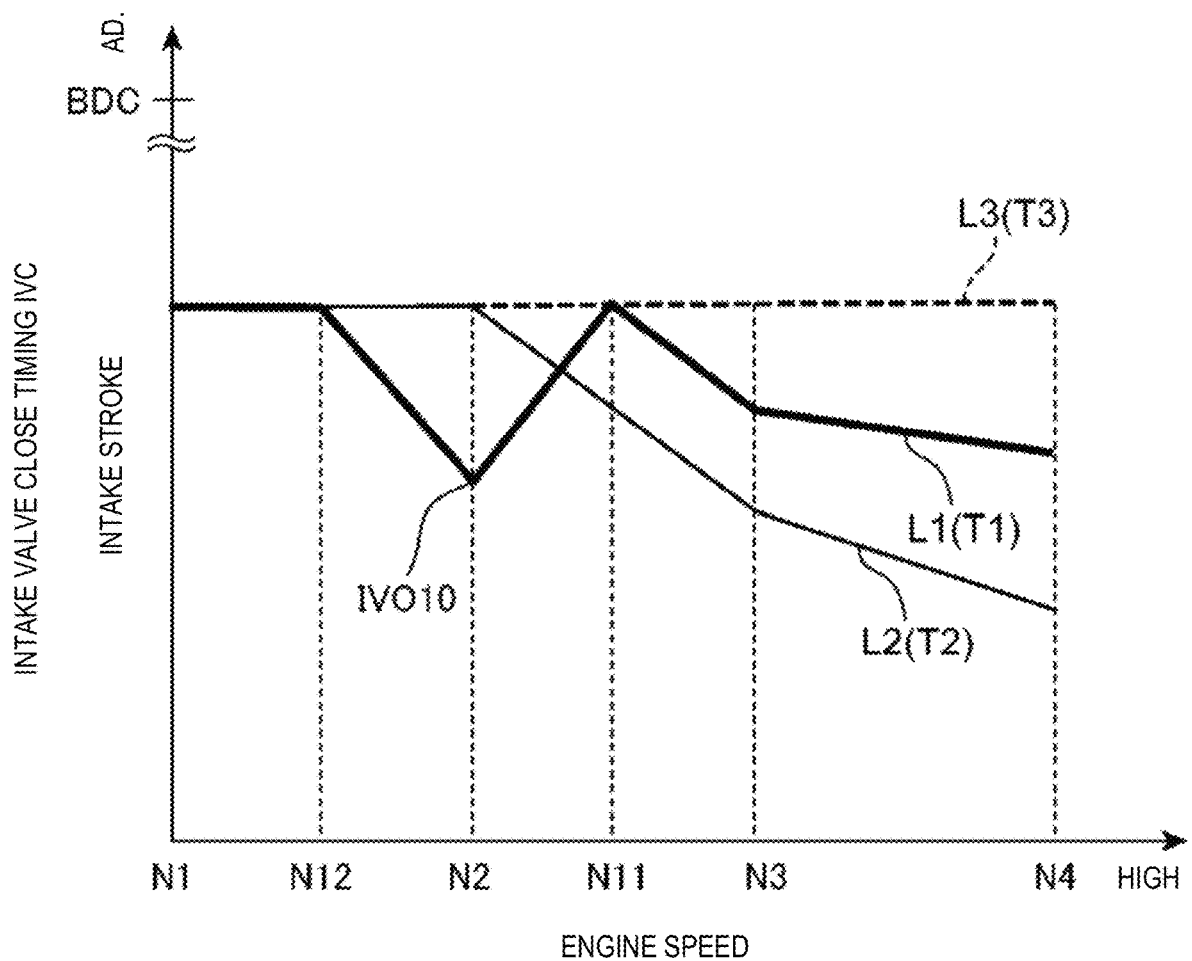
FIG. 15 is a chart illustrating a relationship between the engine speed and the close timing of the intake valve set at respective engine loads within the first partially warmed-up range.

FIG. 14 is a chart illustrating an example of the open timing IVO of the intake valve 11 in the first partially warmed-up range B1. FIG. 15 is a chart illustrating an example of the close timing IVC of the intake valve 11 in the first partially warmed-up range B1. As described above, the intake valve 11 is changed in the open timing and the close timing, while the valve open period is maintained at a constant length. Therefore, the close timing IVC of the intake valve 11 changes according to the engine load and the engine speed, similar to the open timing IVO of the intake valve 11.

FIG. 14 (FIG. 15) illustrates a chart where the horizontal axis is the engine speed and the vertical axis is the open timing IVO (close timing IVC) of the intake valve 11. The engine speeds N1, N2, N3, and N4 of the horizontal axis in FIG. 14 (FIG. 15) correspond to the engine speeds N1, N2, N3, and N4 of the horizontal axis in FIG. 13. Moreover, each of the lines L1, L2, and L3 in FIG. 14 (FIG. 15) is a line connecting values of the open timing IVO (close timing IVC) of the intake valve 11 at an operation point where the engine load is the same, and these lines L1-L3 indicate the open timing IVO (close timing IVC) of the intake valve when the engine load is the first load T1, the second load T2, and the third load T3, which are illustrated in FIG. 13, respectively.

The first load T1, the second load T2, and the third load T3 are the engine loads set in an ascending order (T1<T2<T3). The line L1 represents the engine speed and the open timing IVO (close timing IVC) of the intake valve 11 in a range where the engine load is near the first load Ti, that is, a low load range C1 (hereinafter, may suitably be referred to as the "low load G/F lean range C1"), the line L2 represents the engine speed and the open timing IVO (close timing IVC) of the intake valve 11 in a range where the engine load is near the second load T2, that is, a middle load range C2 (hereinafter, may suitably be referred to as the "middle load G/F lean range C2"), and the line L3 represents the engine speed and the open timing IVO (close timing IVC) of the intake valve 11 in a range where the engine load is near the third load T3, that is, a high load engine load range C3 (hereinafter, may suitably be referred to as the "high load G/F lean range C3").

The middle load G/F lean range C2 of the first partially warmed-up range B1 where the engine load is near the second load T2 is one example of a "first operating range," the low load G/F lean range C1 of the first partially warmed-up range B1 where the engine load is near the first load T1 is one example of a "second operating range," and the high load G/F lean range C3 of the first partially warmed-up range B1 where the engine load is near the third load T3 is one example of a "third operating range."

As illustrated in FIG. 14, throughout the first partially warmed-up range B1, the open timing IVO of the intake valve 11 is set at a timing on an advancing side of TDC of the exhaust stroke. As illustrated in FIG. 15, throughout in the first partially warmed-up range B1, the close timing IVC of the intake valve 11 is set at a timing on a retarding side of a bottom dead center (BDC) of intake stroke.

As illustrated by the line L1 in FIGS. 14 and 15, in a high-speed segment of the low load G/F lean range C1 where the engine speed is higher than a first reference speed N11, the open timing IVO and the close timing IVC of the intake valve 11 are set at timings on a more retarding side as the engine speed increases. In the example of FIGS. 14 and 15, in the high-speed range of the low load G/F lean range C1 where the engine speed is higher than the preset first reference speed N11, the open timing IVO and the close timing IVC of the intake valve 11 are retarded as the engine speed increases. Moreover, in this embodiment, the open timing IVO and the close timing IVC of the intake valve 11 are set at a most advanced timing (most advanced-side timing of a changeable range) when the engine speed is the first reference speed N11, and the open timing IVO and the close timing IVC of the intake valve 11 are retarded from the maximum advanced timing as the engine speed increases.

On the other hand, in a segment of the low load G/F lean range C1 where the engine speed is lower than the first reference speed N11 (hereinafter, may suitably be referred to as the "low-load low-speed range"), the open timing IVO and the close timing IVC of the intake valve 11 are set at timings on the most retarded side at an middle engine speed of the low-load low-speed range.

For example, in a range where the engine speed is lower than a preset second reference speed N12, the open timing IVO and the close timing IVC of the intake valve 11 are maintained at constant timings, regardless of the engine speed. Here, in this embodiment, the open timing IVO and the close timing IVC of the intake valve 11 are maintained at the maximum advanced timing.

On the other hand, in a range where the engine speed is from the second reference speed N12 to the second speed N2, the open timing IVO and the close timing IVC of the intake valve 11 are retarded as the engine speed increases. In this embodiment, the open and close timings are gradually retarded from the maximum advanced timing as the engine speed increases from the second reference speed N12.

Moreover, in a range where the engine speed is from the second speed N2 to the first reference speed N11, the open timing IVO and the close timing IVC of the intake valve 11 are advanced as the engine speed increases. In this embodiment, the open timing IVO and the close timing IVC of the intake valve 11 are gradually retarded as the engine speed increases from the first reference speed N11 so that the open timing IVO and the close timing IVC of the intake valve 11 become the maximum advanced timing when the engine speed is the first reference speed N11.

Thus, in the low-speed low-load range, when the engine speed is the second speed N2, the open timing IVO and the close timing IVC of the intake valve 11 are set at the most retarded timing (a timing on the most retarding side among timings set within the low-speed low-load range). The second speed N2 described above is one example of a "particular engine speed" in the claims. Moreover, in the low-speed low-load range, a close timing IVO10 of the intake valve 11 when the engine speed is the second speed N2 is one example of a "particular timing" in the claims.

The open timing IVO and the close timing IVC of the intake valve 11 are set continuously with respect to the engine speed across the first reference speed N11.

As illustrated by the line L2 in FIGS. 14 and 15, in a segment of the middle load G/F lean range C2 including the second load T2 where the engine speed is higher than the second speed N2, the open timing IVO and the close timing IVC of the intake valve 11 are set at timings on the retarding side as the engine speed increases, similar to the segment on the high speed side of the low load G/F lean range C1. In the example of FIGS. 14 and 15, in the segment of the middle load G/F lean range C2 where the engine speed is higher than the second speed N2, the open timing IVO and the close timing IVC of the intake valve 11 are retarded as the engine speed increases. In this embodiment, when the engine speed is the second speed N2, the open timing IVO and the close timing IVC of the intake valve 11 are set at the maximum advanced timing, and the open timing IVO and the close timing IVC of the intake valve 11 are retarded from the maximum advanced timing as the engine speed increases from the second speed N2.

Note that in the example of FIGS. 14 and 15, the first reference speed N11 differs from the second speed N2, and the first reference speed N11 is higher than the second speed N2.

On the other hand, in a segment of the middle load G/F lean range C2 where the engine speed is lower than the second speed N2, the open timing IVO and the close timing IVC of the intake valve 11 are maintained at constant timings, regardless of the engine speed. Here, in this embodiment, the open timing IVO and the close timing IVC of the intake valve 11 are maintained at the maximum advanced timing.

As illustrated by the line L3 of FIGS. 14 and 15, in the high load G/F lean range containing the third load T3, the open timing IVO and the close timing IVC of the intake valve 11 are maintained at constant timings regardless of the engine speed. In this embodiment, these timings IVO and IVC are maintained at the maximum advanced timings.

(b) Open and Close Timings of Exhaust Valve

Figure 16:
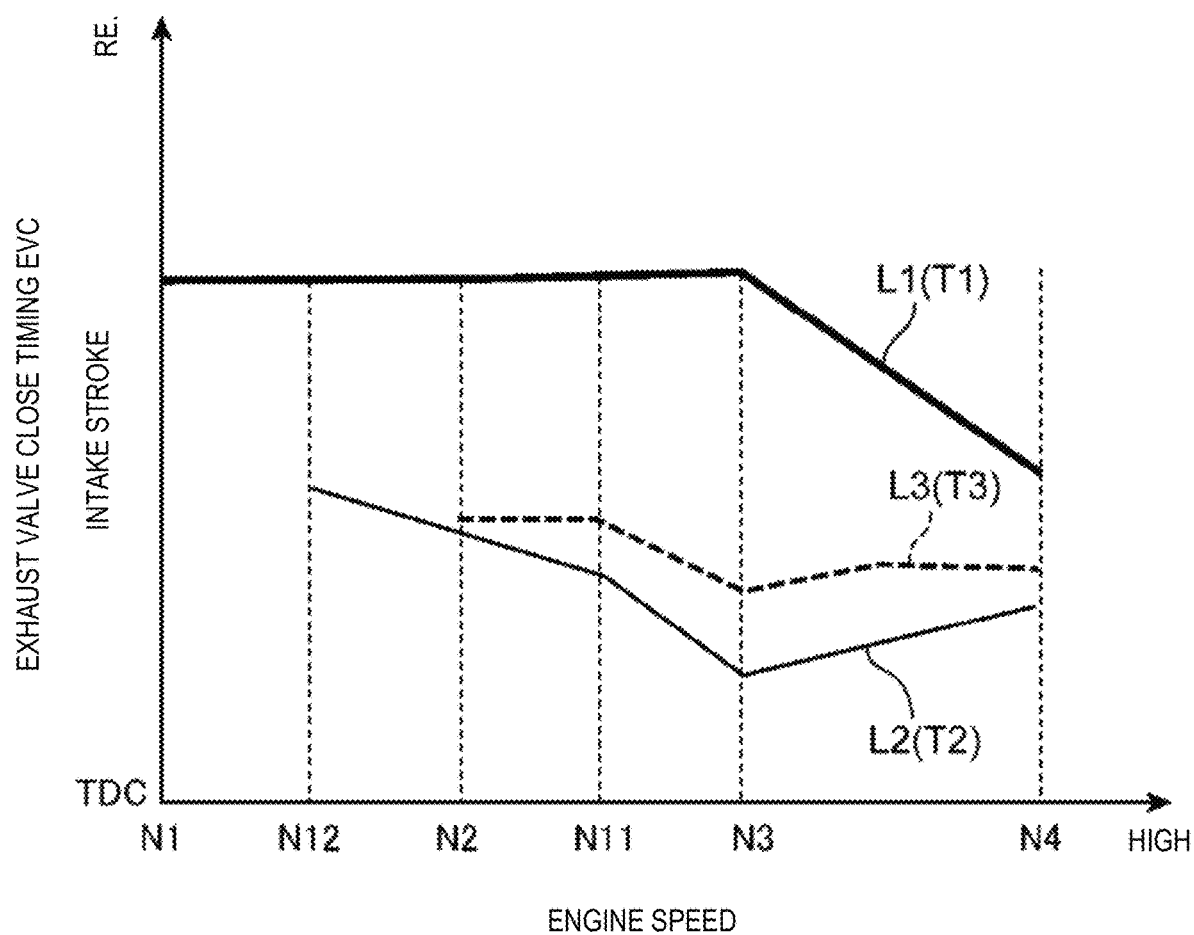
FIG. 16 is a chart illustrating a relationship between the engine speed and the close timing of the exhaust valve set at respective engine loads within the first partially warmed-up range.

FIG. 16 illustrates a chart corresponding to FIGS. 14 and 15, and is a chart illustrating an example of the close timing EVC of the exhaust valve 12 in the first partially warmed-up range B1. As described above, the exhaust valve 12 is changed in the open timing and the close timing, while the valve open period is maintained at the constant length. Therefore, although illustration is omitted, the open timing EVO of the exhaust valve 12 changes according to the engine load and the engine speed, similar to the close timing EVC of the exhaust valve 12.

FIG. 16 illustrates a chart where the horizontal axis is the engine speed and the vertical axis is the close timing EVC of the exhaust valve 12. The engine speeds N1, N2, N3, and N4 of the horizontal axis in FIG. 16 correspond to the engine speeds N1, N2, N3, and N4 of the horizontal axis in FIG. 13. Moreover, the lines L1, L2, and L3 in FIG. 16 are lines when the engine load is the first load T1, the second load T2, and the third load T3, respectively.

As illustrated in FIG. 16, substantially throughout the first partially warmed-up range B1, the close timing EVC of the exhaust valve 12 is set at a timing on the retarding side of TDC of the exhaust stroke.

Figure 17:
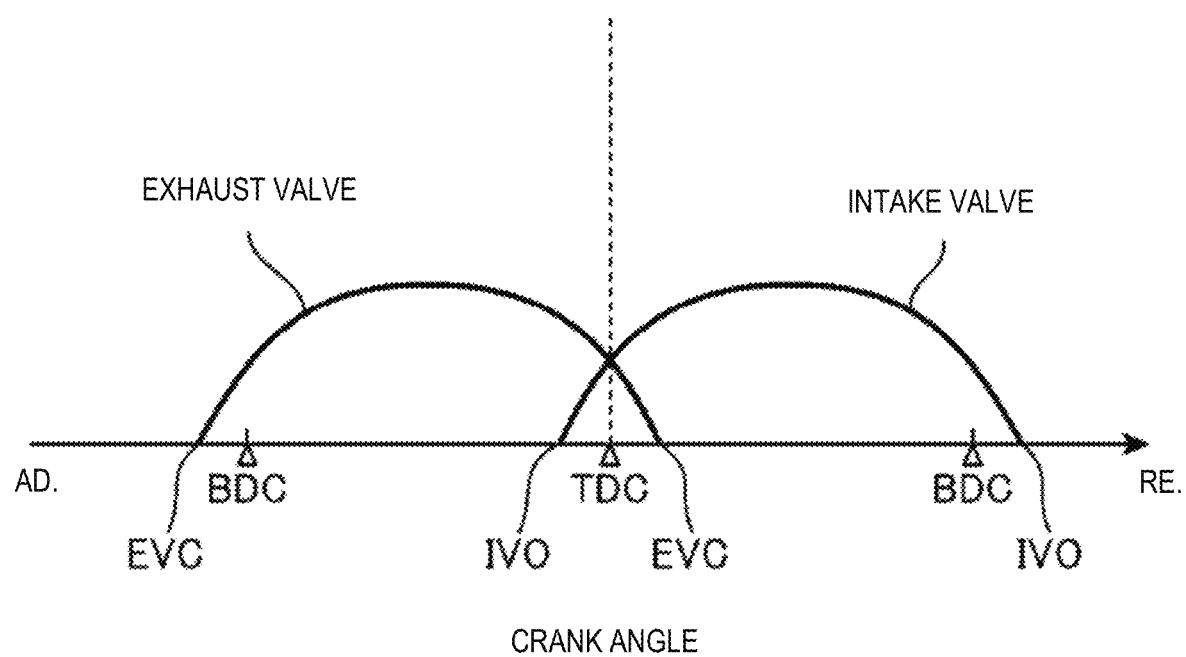
FIG. 17 is a chart illustrating a relationship of valve lifts of the intake valve and the exhaust valve within the first partially warmed-up range.

Accordingly, as illustrated in FIG. 17, substantially throughout the first partially warmed-up range B1, the intake valve 11 and the exhaust valve 12 are opened for a given period across TDC of the exhaust stroke (so-called "valve overlap").

As illustrated by the line L1 of FIG. 16, in a segment of the low load G/F lean range C1 including the first load T1 where the engine speed is lower than the third speed N3, the close timing EVC of the exhaust valve 12 is maintained at a substantially constant, given timing (hereinafter, may suitably be referred to as the "first exhaust valve close timing), regardless of the engine speed. The third speed N3 is set higher than the first and second reference speeds N11 and N12 described above.

On the other hand, in a segment of the low load G/F lean range C1 where the engine speed is higher than the third speed N3, the close timing EVC of the exhaust valve 12 is advanced as the engine speed increases. In this embodiment, the close timing EVC of the exhaust valve 12 is gradually advanced from the first exhaust valve close timing as the engine speed increases from the third speed N3.

As illustrated by the line L2 in FIG. 16, in a segment of the middle load G/F lean range C2 including the second load T2 where the engine speed is lower than the third speed N3, the close timing EVC of the exhaust valve 12 is advanced as the engine speed increases. Note that the rate of change in the close timing EVC of the exhaust valve 12 is smaller in the segment where the engine speed is lower than the first reference speed N11, compared with the segment where the engine speed is higher than the first reference speed N11. On the other hand, in the segment where the engine speed is higher than the third speed N3, the close timing EVC of the exhaust valve 12 is retarded as the engine speed increases.

As illustrated by the line L3 of FIG. 16, in the high load G/F lean range C3 including the third load T3, the close timing EVC of the exhaust valve 12 is maintained at a constant timing, regardless of the engine speed, when the engine speed is lower than the first reference speed N11, and the close timing is advanced as the engine speed increases when the engine speed is from the first reference speed N11 to the third speed N3. On the other hand, when the engine speed is within a range from the third speed N3 to a middle speed between the third speed N3 and the fourth speed N4, the close timing EVC of the exhaust valve 12 is retarded as the engine speed increases. Further, when the engine speed is within a range from this middle speed to the fourth speed N4, the close timing EVC of the exhaust valve 12 is maintained at a constant timing, regardless of the engine speed.

(5) About SI Ratio

As described above, in this embodiment the SPCCI combustion combining the SI combustion and the CI combustion is performed within the first partially warmed-up range B1, etc. In this SPCCI combustion, it is important to control the ratio of the SI combustion to the CI combustion according to the operating condition.

In this embodiment, a SI ratio which is a ratio of a heat amount generated by SI combustion with respect to a total heat amount generated by SPCCI combustion (SI combustion and CI combustion) is used. FIG. 7 is a chart illustrating this SI ratio and illustrating a change in heat generation rate (J/deg) according to the crank angle when SPCCI combustion occurs. A point X1 in the waveform of FIG. 7 is a heat generation point at which the heat generation rate rises with the start of SI combustion, and a crank angle θsi corresponding to this heat generation point X1 is defined as the start timing of SI combustion. The point X2 in the same waveform is a flection point appearing when the combustion mode switches from SI combustion to CI combustion and the crank angle θci corresponding to this flection point X2 may be defined as the start timing of CI combustion. Further, an area R1 of the waveform of the heat generation rate located on the advancing side of θci which is the start timing of CI combustion (from θsi to θci) is set as the heat generation amount by SI combustion, and an area R2 of the waveform of the heat generation rate located on the retarding side of θci is set as a heat generation rate by CI combustion. Thus, the SI ratio defined by (heat generation amount by SI combustion)/(heat generation amount by SPCCI combustion) may be expressed by R1/(R1+R2) using the respective areas R1 and R2. That is, in this embodiment, the SI ratio=R1/(R1+R2).

In CI combustion, since the mixture gas combusts a plurality of times simultaneously by self-ignition, a pressure increase rate easily increases compared to SI combustion which is caused by flame propagation. Therefore, especially if the SI ratio is carelessly decreased (that is, a proportion of CI combustion is increased) under a condition of high load and high fuel injection amount, loud noise is generated. On the other hand, since CI combustion does not occur unless the combustion chamber 6 is sufficiently heated and pressurized, under the condition that the load is low and the fuel injection amount is small, CI combustion is not started unless SI combustion has progressed to some extent, and the SI ratio naturally increases (that is, the proportion of CI combustion increases). In consideration of such circumstances, in this embodiment, the target SI ratio, which is the target value of SI ratio, is determined for each operating condition of the engine in the operation range where SPCCI combustion is performed. For example, within the first partially warmed-up range B1, the target SI ratio is set to decrease as the load substantially increases (that is, the proportion of CI combustion increases). Further correspondingly, in this embodiment, the target θci, which is the start timing of CI combustion when combustion conforming to the target SI ratio is performed, is determined for each operating condition of the engine.

In order to achieve the target SI ratio and the target θci described above, control amounts such as the timing of the main ignition by the spark plug 16, the injection amount/injection timing of fuel from the injector 15, the EGR ratio (the external EGR ratio and the internal EGR ratio) are adjusted for each operating condition. For example, as the ignition timing is advanced, a larger amount of fuel is combusted in SI combustion, and the SI ratio increases. Further, as the injection timing of the fuel is advanced, a larger amount of fuel is combusted in CI combustion, and the SI ratio decreases. Moreover, since a change in the SI ratio is followed by a change in θci, changes in these control amounts (the main ignition timing, the injection timing, etc.) are elements for adjusting θci.

Based on the above tendency, in this embodiment, during the execution of SPCCI combustion, the main ignition timing, the fuel injection amount/injection timing, etc. are controlled in combination with each other to achieve the target SI ratio and target θci described above.

(6) Operations and Effects

As described above, in this embodiment, within the first partially warmed-up range B1, the open and close timings of the intake valve 11 and the open and close timings of the exhaust valve 12 are set as described above, the internal EGR gas and air suitably exist in the combustion chamber 6 at respective operation points within the first partially warmed-up range B1. The suitable SPCCI combustion is realized while forming the G/F lean environment in which the burnt gas remains inside the combustion chamber 6 and the air-fuel ratio that is the ratio of air to fuel inside the cylinder is near the stoichiometric air-fuel ratio. Further, since the air-fuel ratio is near the stoichiometric air-fuel ratio, an exhaust gas is suitably purified by using the three-way catalyst. By making the air-fuel ratio of the mixture gas near the stoichiometric air-fuel ratio, the larger amount of burnt gas is introduced into the combustion chamber 6 compared to a case where the air-fuel ratio is higher than the stoichiometric air-fuel ratio (lean), and the pressure rise at the time of the combustion is suppressed with the large amount of burnt gas so that the increase of combustion noise is avoided. This avoidance of the increase in the combustion noise enables to perform SPCCI combustion at the high load side (the highest load).

For example, in this embodiment, in the middle load G/F lean range C2, at a constant engine load (e.g., the engine load is at the second load T2), the close timing IVC of the intake valve is retarded on the retarding side of BDC of the intake stroke as the engine speed increases. Here, by the inertia of the intake air, the close timing IVC of the intake valve 11 at which the air amount introduced into (confined in) the combustion chamber 6 becomes the largest, is further retarded as the engine speed is higher. Therefore, by changing the close timing IVC of the intake valve as described above, the air amount introduced into the combustion chamber 6 is suitably secured at respective engine speeds in the middle load G/F lean range C2, which improves combustion stability. In this manner, even under the G/F lean environment where burnt gas existing inside the combustion chamber 6 causes the combustion to easily be unstable, the suitable SI combustion, and also SPCCI combustion are realized, which improves fuel efficiency.

Further, when the engine speed is low, a number of combustions per unit time is small and accordingly the temperature inside the combustion chamber 6 easily drops, thus SI combustion easily becomes unstable. In this regard, in this embodiment, in the segment of the middle load G/F lean range C2 where the engine speed is low, the open timing IVO of the intake valve 11 is advanced than TDC of the exhaust stroke and this advancing amount is comparatively large. In this state where the open timing IVO of the intake valve 11 is advanced than TDC of the exhaust stroke, the burnt gas is discharged from the combustion chamber 6 to the intake port 9 as the piston 5 rises on the exhaust stroke, and this gas is introduced into the combustion chamber 6 again. In addition, as the advancing amount of the open timing IVO of the intake valve 11 from TDC of the exhaust stroke is larger, the amount of burnt gas at high temperature (internal EGR gas) discharged from the combustion chamber 6 and flowing back into the combustion chamber 6 increases. Therefore, when the combustion easily becomes unstable as described above, the large amount of high-temperature burnt gas (internal EGR gas) can be introduced into the combustion chamber 6, the temperature inside the combustion chamber 6 increases and the stability of SI combustion improves. Thus, the suitable CI combustion, that is, the suitable SPCCI combustion can be realized near TDC of the compression stroke.

Further, in the low engine speed segment of the middle load G/F lean range C2, the open timing IVO and the close timing IVC of the intake valve 11 are maintained at constant timings, regardless of the engine speed. Therefore, in this segment, while securing the large amount of burnt gas introduced into the combustion chamber 6 as described above, the controllability of the intake valve 11 is improved. That is, when the open timing IVO and the close timing IVC of the intake valve 11 need to be greatly changed according to the change in the engine speed, although there is possibility that the open timing IVO and the close timing IVC of the intake valve 11 may be shifted from the suitable timings due to the response delay of the intake VVT 13a, etc., this can be avoided. In addition, in this embodiment, in the low engine speed segment of the middle load G/F lean range C2, since the open timing IVO of the intake valve 11 is maintained at the maximum advanced timing, the amount of burnt gas introduced into the combustion chamber 6 is surely increased.

Here, it was found that within the low load G/F lean range C1 where the engine load is comparatively low, in the low engine speed segment where the engine speed is low, the close timing IVC of the intake valve 11 it to be retarded so as to introduce suitable amount of air into the cylinder, due to the influence by pulsation of the intake air, etc. In this regard, in this embodiment, in the low engine speed segment of the low load G/F lean range C1, at the engine speed N2 that is the intermediate speed of the low engine speed segment, the close timing IVC of the intake valve 11 is retarded than the close timing IVC of the intake valve 11 at other engine speeds. Thus, in this segment, suitable amount of air can be introduced into the combustion chamber 6 more reliably. Further, in the high engine speed segment within the low load G/F lean range C1, by retarding the close timing IVC of the intake valve 11 more as the engine speed increases similar to the middle load G/F lean range C2, the suitable amount of air can be introduced into the combustion chamber 6 by the inertia of the intake air.

Further, in this embodiment, within the low load G/F lean range C1, the open timing IVO and the close timing IVC of the intake valve 11 are retarded as the engine speed increases from the second reference speed N12 toward the second engine speed N2, whereas the open timing IVO and the close timing IVC of the intake valve 11 are advanced as the engine speed increases from the second engine speed N2 toward the first reference speed N11. Therefore, near the second engine speed N2, the open timing IVO and the close timing IVC of the intake valve 11 are prevented from being sharply changed when the engine speed varies, and thus, the controllability of the intake valve 11 improves.

Further, in the low engine speed segment of the low load G/F lean range C1, the close timing IVC of the intake valve 11 is retarded at the engine speed N2 that is the intermediate speed of this segment as described above, whereas the close timing EVC of the exhaust valve is maintained at the constant timing regardless of the engine speed, and thus, the controllability of the close timing EVC of the exhaust valve improves.

Further, in the high engine speed segment of the low load G/F lean range C1, the close timing EVC of the exhaust valve 12 is advanced on the retarding side of TDC of exhaust stroke as the engine speed increases. Thus, in this high engine speed range in which it is difficult to introduce air into the combustion chamber 6 due to the high engine speed, the amount of burnt gas discharged to the exhaust port 10 and flowing back into the combustion chamber 6 is reduced and a situation in which the amount of burnt gas becomes excessive, and thus, air is interrupted to be introduced is prevented. Further, when the engine speed is comparatively low, the burn gas amount remaining inside the combustion chamber 6 can be increased, the temperature inside the combustion chamber 6 suitably increases and the combustion stability is secured.

Furthermore, within the high load G/F lean range C3 set at the high engine load side, the boost is performed by the booster 33 so that the large amount of air corresponding to the high engine load is introduced into the combustion chamber 6. Thus, within the high load G/F lean range C3, the necessity of adjusting the close timing IVC of the intake valve 11 to increase the air amount is small. In this regard, in this embodiment, within the high load G/F lean range C3, the close timing IVC of the intake valve 11 is maintained at the constant timing, and the controllability of the intake valve 11 improves while securing the air amount introduced into the combustion chamber 6.

Furthermore, in this embodiment, during the execution of SPCCI combustion (while operating within the first partially warmed-up range B1), the timing of the main ignition by the spark plug 16, etc. are adjusted to match the target SI ratio determined according to the operating condition of the engine, the target SI ratio being a target value of a ratio of a heat amount generated by SI combustion with respect to a total heat generation amount in one combustion cycle. Therefore, for example, the ratio of CI combustion is increased (i.e., the SI ratio is reduced) as much as possible within the extent that combustion noise does not become excessive. This results in improving thermal efficiency by SPCCI combustion as much as possible.

(7) Modifications

In this embodiment, although the case where, in the segment of the middle load G/F lean range C2 where the engine speed is low, the open timing IVO of the intake valve 11 is maintained at constant timings regardless of the engine speed is described, it is not limited to this unless the intake open timing IVO in this segment is set so that the rate of change thereof with respect to the engine speed is smaller than the change rate of the intake open timing IVO with respect to the engine speed in the high engine speed segment (of the middle load G/F lean range C2). Therefore, in the low engine speed segment of the middle load G/F lean range C2, the intake open timing IVO may be advanced slightly as the engine speed decreases.

Further, in this embodiment, the SI ratio which is the ratio of the heat amount generated by SI combustion with respect to the total heat amount generated by SPCCI combustion is defined as R1/(R1+R2) by using the areas R1 and R2 in the combustion waveform of FIG. 7, and the main ignition timing is adjusted to match the given target SI ratio; however, the SI ratio may be defined in other manners.

Figure 18:
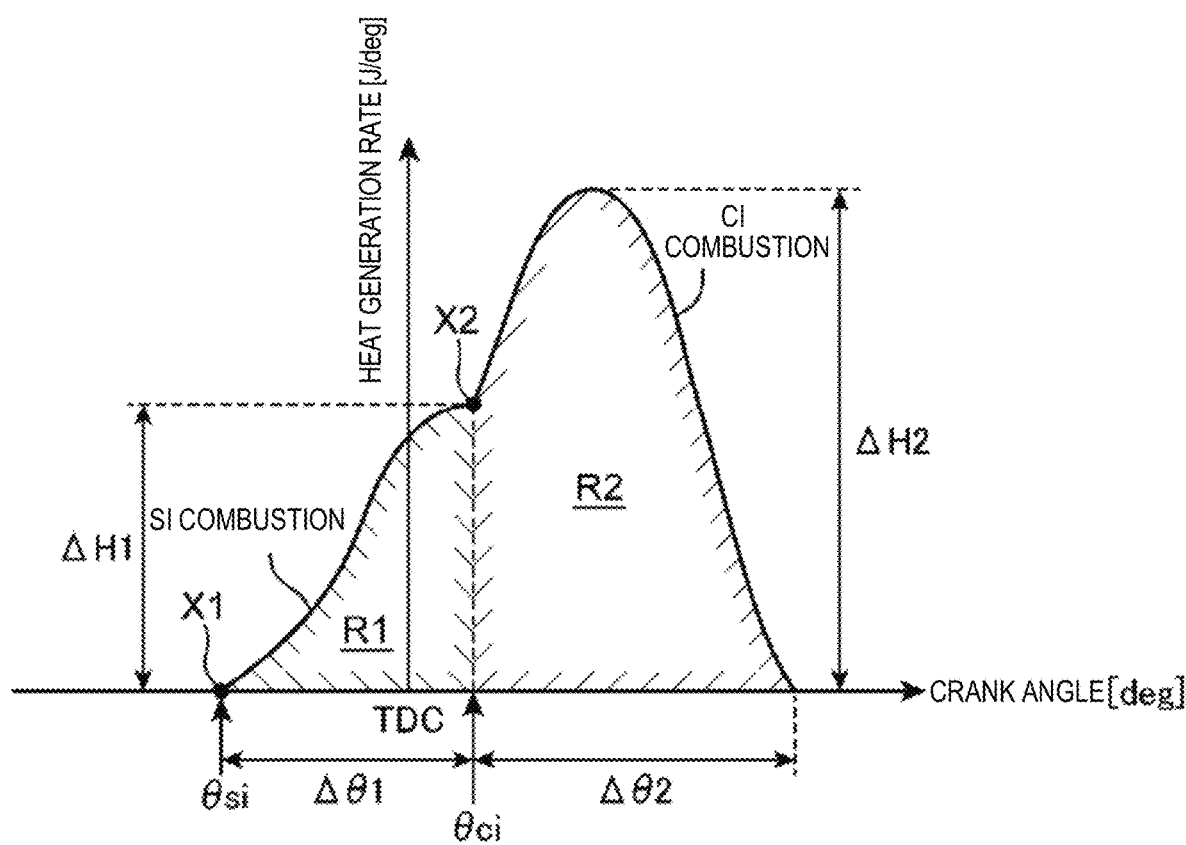
FIG. 18 is a chart corresponding to FIG. 7, illustrating various defining methods of an SI ratio.

For example, SI ratio=R1/R2 may be established. Further, the SI ratio may be defined using $\Delta\theta 1$ and $\Delta\theta 2$ illustrated in FIG. 18. That is, when the crank angle period of SI combustion (the combustion period on the advancing side of the flection point X2) is $\Delta\theta 1$, and the crank angle period of CI combustion (the combustion period on the retarding side of the flection point X2) is $\Delta\theta 2$, SI ratio=$\Delta\theta 1/(\Delta\theta 1+\Delta\theta 2)$ or SI ratio=Δθ1/Δθ2 may be established. Alternatively, when a peak of the heat generation rate of SI combustion is ΔH1 and a peak of the heat generation rate of CI combustion is Δ2, SI ratio=ΔH1/(ΔH1+ΔH2) or SI ratio=ΔH1/ΔH2 may be established.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 Cylinder
11 Intake Valve
12 Exhaust Valve
13a Intake VVT (Intake Phase-Variable Mechanism)
14a Exhaust VVT (Exhaust Variable Mechanism)
15 Injector
16 Spark Plug
30 Intake Passage
40 Exhaust Passage
100 ECU (Controller)

What is claimed is:

1. A control system for a compression-ignition engine including a cylinder, an intake passage, an exhaust passage, an intake port communicating the intake passage to the cylinder, an intake valve configured to open and close the intake port, an exhaust port communicating the exhaust passage to the cylinder, an exhaust valve configured to open and close the exhaust port, an injector configured to inject fuel into the cylinder, and a spark plug configured to ignite a mixture gas containing the fuel injected by the injector and air, the engine executing partial compression-ignition combustion in which the mixture gas is spark-ignited with the spark plug to be partially combusted by spark ignition (SI) combustion and the remaining mixture gas self-ignites to be combusted by compression ignition (CI) combustion, comprising:
   an intake phase-variable mechanism configured to simultaneously change an open timing and a close timing of the intake valve; and
   a controller including a processor configured to control parts of the engine, including the intake phase-variable mechanism and the spark plug, wherein
   the controller controls the intake phase-variable mechanism to form a gas-fuel ratio (G/F) lean environment in which burnt gas remains inside the cylinder and an air-fuel ratio that is a ratio of air to fuel inside the cylinder is near a stoichiometric air-fuel ratio, and controls the spark plug to spark-ignite the mixture gas so as to combust by the partial compression-ignition combustion at a given timing, and
   the controller controls the intake phase-variable mechanism to retard, as an engine speed increases at a constant engine load, the close timing of the intake valve on a retarding side of a bottom dead center of intake stroke and the open timing of the intake valve on an advancing side of a top dead center of exhaust stroke, so that a rate of change in the open timing of the intake valve with respect to the engine speed in a high engine speed range is greater than that in a low engine speed range.

2. The control system of claim 1, wherein the controller controls the intake phase-variable mechanism so that the close timing of the intake valve is fixed in the low engine speed range, regardless of the engine speed.

3. The control system of claim 1, wherein
   while the engine operates within a given first operating range where the partial compression-ignition combustion is carried out under the G/F lean environment, the controller controls the spark plug and the intake phase-variable mechanism to retard, as the engine speed increases at a constant engine load, the close timing of the intake valve on the retarding side of the bottom dead center of intake stroke and the open timing of the intake valve on the advancing side of the top dead center of exhaust stroke so that the rate of change in the open timing of the intake valve according to the engine speed in the high engine speed range becomes larger than that in the low engine speed range,
   while the engine operates within a given second operating range that is on a lower engine load side than the first operating range where the partial compression-ignition combustion is carried out under the G/F lean environment, the controller controls the intake phase-variable mechanism to retard the close timing of the intake valve, as the engine speed increases in a high engine speed segment at a constant engine load, and
   while the engine operates in a low engine speed segment within the second operating range, the controller controls the intake phase-variable mechanism to retard, at a particular engine speed set at an intermediate location of the low engine speed segment, the close timing of the intake valve to a particular timing on a retarding side of the close timing of the intake valve at other engine speeds in the low engine speed segment.

4. The control system of claim 3, wherein, while the engine operates in the low engine speed segment within the second operating range, the controller controls the intake phase-variable mechanism to retard the close timing of the intake valve toward the particular timing as the engine speed increases, when the engine speed is lower than the particular engine speed, and retard the close timing of the intake valve to the particular timing as the engine speed decreases, when the engine speed is higher than the particular engine speed.

5. The control system of claim 3, further comprising an exhaust variable mechanism configured to change a close timing of the exhaust valve,
   wherein while the engine operates in the low engine speed segment within the second operating range, the controller controls the exhaust variable mechanism to maintain a close timing of the exhaust valve at a substantially constant timing, regardless of the engine speed.

6. The control system of claim 5, wherein while the engine operates in an engine speed segment where the engine speed is at least higher than the low engine speed segment within the second operating range, the controller controls the exhaust variable mechanism to advance, as the engine speed increases, the close timing of the exhaust valve on a retarding side of the top dead center of the exhaust stroke.

7. The control system of claim 3, further comprising:
   a booster configured to boost intake air to be introduced into the cylinder; and
   a boost switching mechanism configured to switch a state of the booster between a boosting state in which the booster boosts intake air and a non-boosting state in which the booster does not boost intake air, wherein while the engine operates within the second operating range, the controller controls the boost switching mechanism to set the state of the booster as the non-boosting state, and while the partial compression-ignition combustion is carried out under the G/F lean environment within a third operating range that is on a higher engine load side than the first operating range, the controller controls the boost switching mechanism to set the state of the booster as the boosting state, and controls the intake phase-variable mechanism so that the close timing of the intake valve is maintained at a constant timing, regardless of the engine speed.

8. The control system of claim 1, wherein, during the partial compression-ignition combustion, the controller sets a target SI ratio according to an operating condition of the engine and sets an ignition timing of the spark plug based on the target SI ratio, the target SI ratio being a target value of a ratio of a heat amount generated by the SI combustion with respect to a total heat generation amount in one combustion cycle.

* * * * *